United States Patent [19]

Nishio et al.

[11] Patent Number: 5,719,633
[45] Date of Patent: Feb. 17, 1998

[54] VIDEO SIGNAL FORMAT CONVERSION APPARATUS USING SIMPLIFIED SHIFTING AND PROCESSING CONTROL

[75] Inventors: Toshirou Nishio, Hirakata; Masashi Kubota, Kobe; Hidekazu Suzuki, Yamatokoriyama, all of Japan

[73] Assignee: Matsushita Electric Industrial Co., Ltd., Kadoma, Japan

[21] Appl. No.: 574,720

[22] Filed: Dec. 20, 1995

[30] Foreign Application Priority Data

Dec. 20, 1994 [JP] Japan ................. 6-316342

[51] Int. Cl.$^6$ ................................. H04N 7/01
[52] U.S. Cl. ............... 348/441; 348/458; 348/445
[58] Field of Search ....................... 348/441, 443, 348/445, 446, 448, 458, 459, 720, 572; H04N 7/01

[56] References Cited

U.S. PATENT DOCUMENTS

| | | | |
|---|---|---|---|
| 4,802,025 | 1/1989 | Shinada | 360/36.2 |
| 4,872,054 | 10/1989 | Gray et al. | 348/441 |
| 5,182,633 | 1/1993 | Antonio et al. | 348/441 |
| 5,243,421 | 9/1993 | Nagata et al. | 358/140 |
| 5,331,346 | 7/1994 | Shields et al. | 348/441 |

FOREIGN PATENT DOCUMENTS

| | | |
|---|---|---|
| 0213912 | 8/1986 | European Pat. Off. |
| 1194784 | 4/1989 | Japan. |

OTHER PUBLICATIONS

IEEE Transactions on Consumer Electronics 40 (1994) Aug., No. 3, New York, US, "Combined TV Format Control and Sampling Rate Conversion IC", pp. 711–716.

IEEE Transactions on Consumer Electronics 38 (1992) Aug., No. 3, New York, US, "Development of Picture Converting System Applying An NTSC Signal to a Wide Aspect Display", pp. 303–311.

Search Report for EP Application 95119980.1, Mailed Oct. 8, 1996.

*Primary Examiner*—Victor R. Kostak
*Attorney, Agent, or Firm*—Renner, Otto, Boiselle & Sklar, P.L.L.

[57] ABSTRACT

A video signal format conversion apparatus, includes a memory for writing an input data by a first clock equal to a sampling rate of the input data and reading the input data by a second clock which is different from the first clock; a shift register for shifting the data read by the memory by the second clock; a multiplication and summation circuit for multiplying each of a plurality of data output from the shift register by a factor corresponding thereto among the plurality of factors and outputting a sum of values obtained by the multiplication by the second clock.

8 Claims, 22 Drawing Sheets

FIG.10
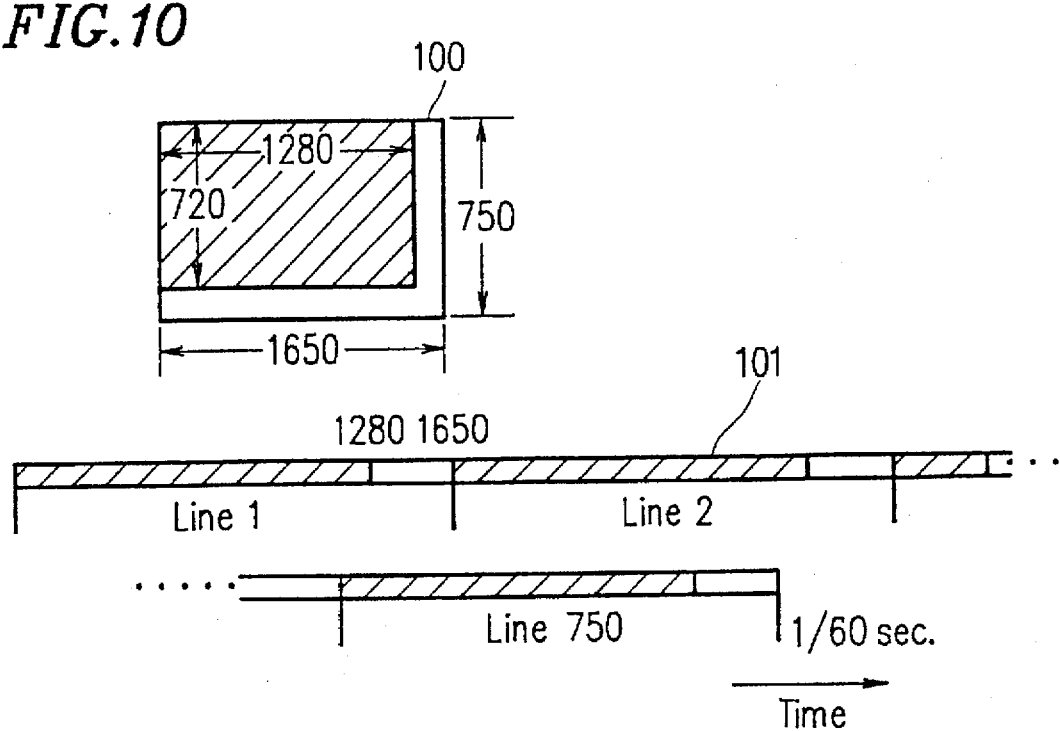
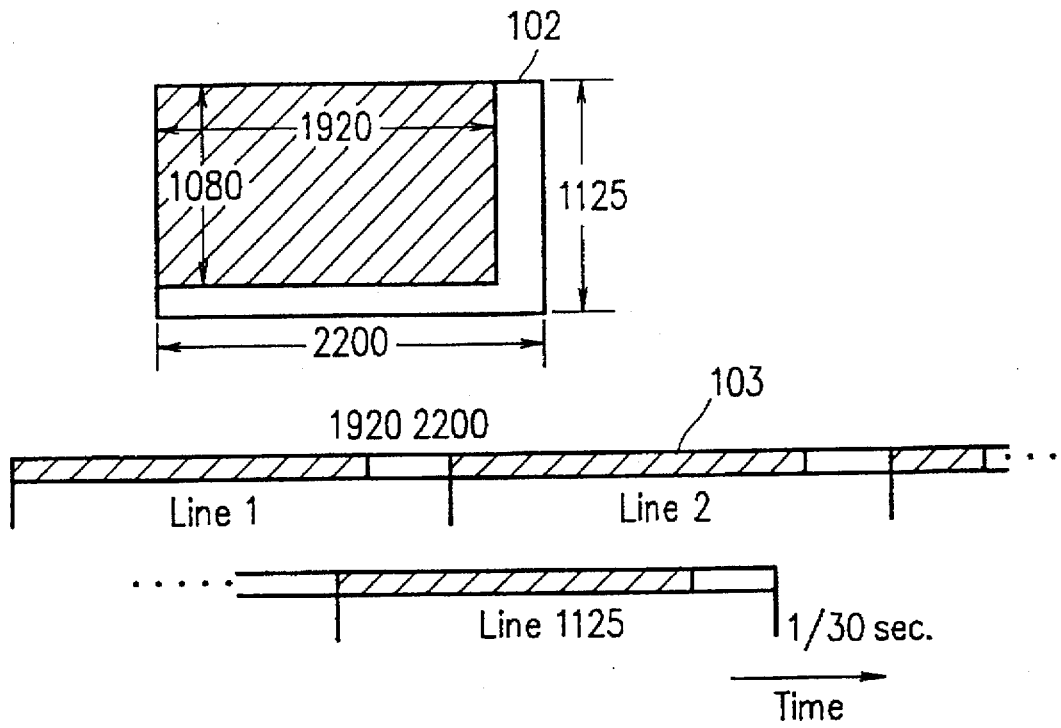

(a) Original sampling data
(b) After zero interpolation
(c) After low-pass filtering
(d) After 3-times subsampling
(e) Original data array after sampling
(f) After zero interpolation
(g) After low-pass filtering
(h) After 3-times subsampling

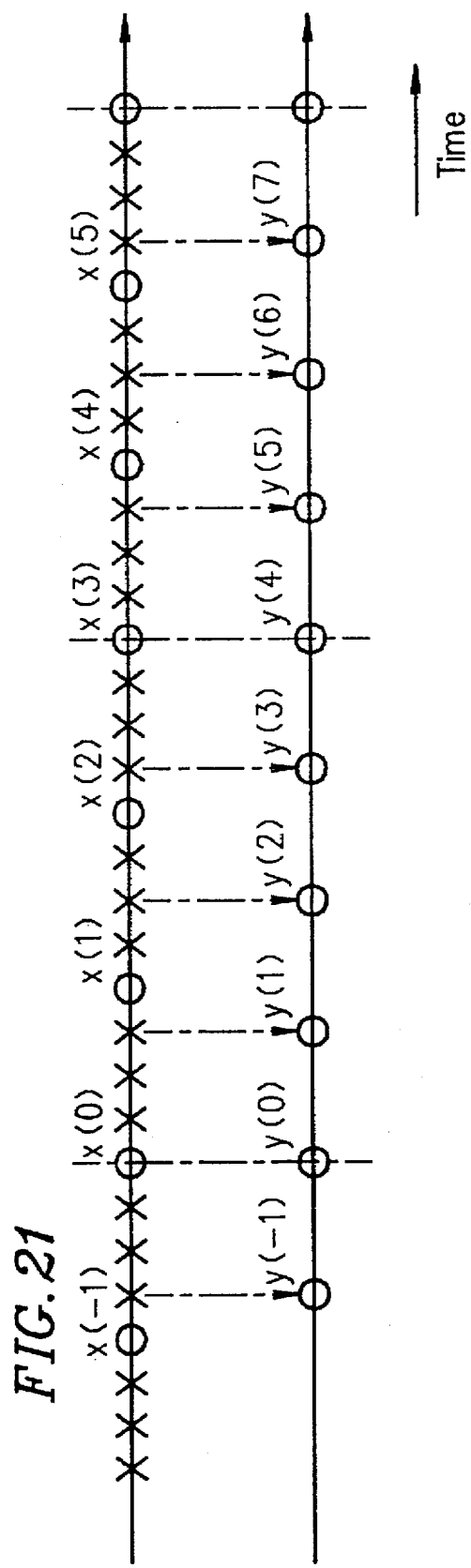

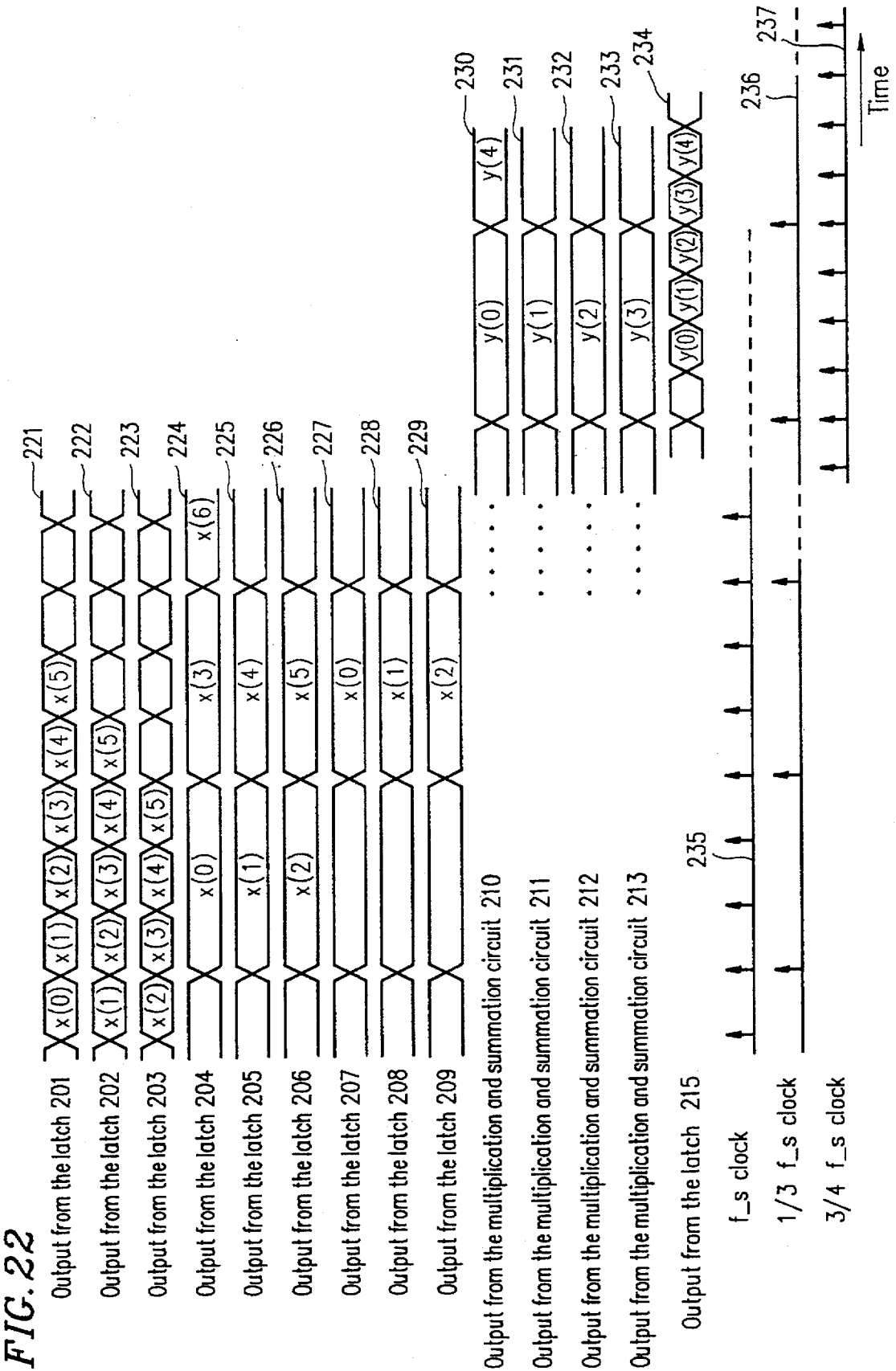

VIDEO SIGNAL FORMAT CONVERSION APPARATUS USING SIMPLIFIED SHIFTING AND PROCESSING CONTROL

BACKGROUND OF THE INVENTION

1. Field of the Invention

The present invention relates to a video signal conversion apparatus, and in particular to an apparatus for converting a format of a digital video signal.

2. Description of the Related Art

It is sometimes necessary to process digital data obtained by sampling an analog video signal. The number of dots of an image both in the horizontal and vertical directions is determined and thus an image format is determined, merely by the sampling frequency. In order to display video signals of different sized images on a single display at a correct aspect ratio, it is necessary to convert the format of the input video signal into a desirable format suitable for the display while maintaining the signal as a digital signal.

In ATV (Advanced TeleVision), which is a next-generation digital broadcasting system in the United States, a plurality of video formats to be transmitted are set as is shown in Table 1, which are referred to as "multiple formats".

TABLE 1

| Horizontal × vertical | Frame frequency | Inter./Prog. |
|---|---|---|
| 1920 × 1080 | 29.97/30.00 | 2:1 |
| 1920 × 1080 | 24.00/23.98 | 1:1 |
| 1920 × 1080 | 29.97/30.00 | 1:1 |
| 1440 × 1080 | 59.94/60.00 | 2:1 |
| 1280 × 720 | 59.94/60.00 | 1:1 |
| 1280 × 720 | 23.98/24.00 | 1:1 |
| 1280 × 720 | 29.97/30.00 | 1:1 |

Such a format is converted by converting the sampling frequencies in the horizontal and vertical directions. Hereinafter, the principle of conversion of a sampling frequency will be described. In the following example, a signal representing 1440 dots is converted into a signal representing 1920 dots in the horizontal direction. In such conversion from 1440 dots into 1920 dots, which is referred to as "horizontal 3→4 conversion", four pixel values are generated based on three pixel values. Conversion of the number of pixels only in the horizontal direction is sufficient in this case.

FIG. 19 is a view illustrating the positional relationship between pixels with respect to the scanning line and spectra with respect to the frequency axis to describe the principle of the horizontal 3→4 conversion. Parts (a) through (d) show the positional relationship between pixels; and parts (e) through (h) show the spectra. Part (a) shows the positions of the original sampling data. The horizontal axis represents the scanning line in a display screen. In the case of a monochrome display, each "sampling data" indicates the luminance of each pixel with, for example, an integer in the range of 0 through 255.

By over-sampling the sampling data shown in part (a) by four times, three sampling data are added between two adjacent original sampling data as is shown in part (b). By over-sampling, the data rate temporarily raises to four times the data rate of the input signal. The symbol "x" indicates the position at which "0" has been added as sampling data, namely, the position at which "zero interpolation" has been performed by over-sampling.

By low-pass-filtering the sampling data shown in part (b), the sampling data shown in part (c) are obtained. By performing "3 times subsampling", namely, by outputting every third pixel, the sampling data shown in part (d) are obtained. In this manner, the horizontal 3→4 conversion is completed.

Part (e) through (h) show the spectra with respect to the frequency axis. The spectra in parts (e) through (h) respectively correspond to the sampling data in parts (a) through (d). The low-pass filter is used to limit the band for prohibiting aliasing on the frequency axis. Part (e) shows the spectra in the frequency band of the input signal obtained by sampling performed at the frequency f_s. Aliasing occurs every f_s.

Part (f) shows the spectra of the data obtained by 1:4 zero interpolation. It is appreciated that the interval between carriers is expanded from f_s to 4f_s on the frequency axis by over-sampling. Part (g) shows the spectra obtained after low-pass filtering for attenuating the signals other than the signals in the vicinity of the carriers. As is shown, an aliasing component is removed by low-pass filtering. Part (h) shows the spectra obtained by performing 3-times subsampling of the signals shown in part (g) having no aliasing component. Since the carrier frequency becomes ⅓, aliasing occurs every 4/3.f_s. However, since the band is limited by low-pass filtering in advance to avoid overlapping of the aliasing component, the signal components are not overlapped in the vicinity of each carrier. Thus, conversion of the sampling frequency is performed without the aliasing component being included in the signal.

Hereinafter, a conventional video signal format conversion apparatus 50 which operates based on the above-described principle will be described. In the following example, conversion of a signal representing 1440 dots into a signal representing 1920 dots in the horizontal direction will be described. No operation in the vertical direction is required. The principle of frequency conversion in the vertical direction is the same as the principle of frequency conversion in the horizontal direction.

FIG. 20 is a block diagram of the conventional video signal format conversion apparatus 50. For simplicity, the clock which is equal to the data rate of the input signal is expressed as f_s.

The conventional video signal format conversion apparatus 50 includes latches 201, 202 and 203 operating at f_s, latches 204 through 209 operating at ⅓.f_s, multiplication and summation circuits 210 through 213 for multiplying some of the outputs from the latches 204 through 209 by their respective weighting factors and summating the resultant values, a selector 214 for selecting one of the outputs from the multiplication and summation circuits 210 through 213, and a latch 215 operating at 4/3.f_s.

The conventional video signal format conversion apparatus 50 shown in FIG. 20 operates in the following manner.

FIG. 21 is a view illustrating the positional relationship between the sampling data obtained from the input signal and the sampling data obtained from the output signal. The value of the input signal changes as x(0), x(1), x(2), ... x(n) over time. The numerical figure "n" in ( ) is an integer parameter. An increase in the integer parameter indicates the passage of one sampling period. The value of the output signal changes as y(0), y(1), y(2), ... y(n) over time.

In this example, the number of taps for operation performed by the low-pass filter for sampling frequency conversion is 11. The weighting factors are assumed to be:

k(5),k(4),k(3),k(2),k(1),k(0),k(1),k(2),k(3),k(4),k(5)   (1)

In k(m), m=0, 1, 2, 3, 4, 5. From the positional relationship between x(n) and y(n) and the principle of sampling frequency conversion, data y(0) is obtained by:

$$y(0)=k(4)\cdot x(-1)+k(0)\cdot x(0)+k(4)\cdot x(1) \quad (2)$$

y(1), y(2), and y(3) are obtained by:

$$y(1)=k(3)\cdot x(0)+k(1)\cdot x(1)+k(5)\cdot x(2) \quad (3)$$

$$y(2)=k(2)\cdot x(1)+k(2)\cdot x(2) \quad (4)$$

$$y(3)=k(5)\cdot x(1)+k(1)\cdot x(2)+k(3)\cdot x(3) \quad (5)$$

FIG. 22 is a timing diagram of the signals output from various parts of the conventional video signal format conversion apparatus 50. In FIG. 22, data streams 221 through 229 indicate the outputs from the latches 201 through 209; data streams 230 through 233 indicate the outputs from the multiplication and summation circuits 210 through 213; and data stream 234 indicates the output from the latch 215. Clock 235 indicates the driving clock f_s for driving each latch which is equal to the data rate of the input signal. Clock 236 indicates ⅓·f_s, and clock 237 indicates 4/3·f_s.

Assuming that the outputs from the latches 201 through 203 operating at the clock f_s change as is shown in FIG. 22, the outputs from the latches 204 through 209 and the ⅓·f_s clock have the relationship in phase shown in FIG. 22. Thus, several clocks later, the outputs y(0), y(1), y(2) and y(3) are output simultaneously from the multiplication and summation circuits 210 through 213 in synchronization with the ⅓·f_s clock. (How many clocks later y(0) through y(3) are output depends on the structure of the multipliers.)

The selector 214 operates so as to cause these signals obtained simultaneously to be selectively output at 4/3·f_s in terms of time. The output is shown by data stream 234 in FIG. 22. In this manner, the horizontal 3→4 conversion is finished. Namely, the video signal format is converted.

Such a conventional video signal format conversion apparatus has the following problems.

(1) A plurality of multiplication and summation circuits (four in the above-described example) are required, which increases the gate scale and the total power generation and thus is not preferable for integrating the circuits as an LSI. Further, such a structure is not effectively used since the data rate which is once reduced to ⅓ requires a ⅓ clock even in the environment which allows for use of a faster clock.

(2) Three types of clocks are required: a clock having a frequency equal to the data rate of the input signal, a clock having the data rate lowered to ⅓, and a clock having the data rate raised to 4/3. Under such circumstances, a desirable operation output cannot be obtained unless the relative phases of these clocks are appropriate.

(3) Different logic sections in the hardware operate by different clocks. In the case where the circuit which will be integrated into an LSI includes logic sections operating by a plurality of clocks, the circuit pattern needs to be designed with extreme care so as to prevent crosstalk. Such a structure is not preferable for the safety of the system.

SUMMARY OF THE INVENTION

In one aspect of the present invention, a video signal format conversion apparatus includes a memory for writing an input data by a first clock equal to a sampling rate of the input data and reading the input data by a second clock which is different from the first clock; a shift register for shifting the data read by the memory by the second clock; a multiplication and summation circuit for multiplying each of a plurality of data output from the shift register by a factor corresponding thereto among the plurality of factors and outputting a sum of values obtained by the multiplication by the second clock.

In one embodiment of the invention, the multiplication and summation circuit includes a factor register for storing the plurality of factors; a factor selector for selectively outputting the plurality of factors output from the factor register; a plurality of multipliers for multiplying the plurality of data output from the shift register by the respective factors output from the factor selector; and an adder for outputting the sum of the values output from the plurality of multipliers.

In one embodiment of the invention, the adder generates a sum of three data output from the multipliers.

In one embodiment of the invention, the video signal format conversion apparatus further includes a data selector for selectively supplying the multipliers with the plurality of data output from the shift register.

In another aspect of the present invention, a video signal format conversion apparatus includes a plurality of memories for writing an input data by a first clock equal to a sampling rate of the input data and reading the input data by a second clock which is different from the first clock; a line memory array for storing the data corresponding to one line read from the plurality of memories; a vertical direction operation circuit driven by the second clock for multiplying each of the plurality of signals output from the line memory array by a factor corresponding thereto among a plurality of factors in the vertical direction and summating values obtained by the multiplication; and a horizontal direction operation circuit driven by the second clock for multiplying each of a plurality of signals output from the vertical direction operation circuit by a factor corresponding thereto among the plurality of factors in the horizontal direction and summating values obtained by the multiplication.

In one embodiment of the invention, the line memory array includes a plurality of selectors for selectively outputting a plurality of signals output from the plurality of memories; and a plurality of delay circuits for delaying the signals output from the respective selectors.

In one embodiment of the invention, the vertical direction operation circuit includes a factor register for storing the plurality of factors; a factor selector for selectively outputting the plurality of factors; a plurality of multipliers for respectively multiplying the plurality of data output from the line memory array and the respective factors output from the factor selectors; and an adder for outputting the sum of the values output from the plurality of multipliers.

In one embodiment of the invention, the adder generates a sum of three data output from the multipliers.

According to the present invention, the asynchronous memory performs the rate conversion from the writing rate synchronous with the input signal (also synchronous with the first clock) to the reading rate synchronous with the output signal (also synchronous with the second clock). The shift register delays the signal from the asynchronous memory synchronous with the second clock. The multiplication and summation circuit multiplies the output from the shift register by a factor changing over time and summating the multiplication results to obtain the final output signal.

By such operation, only one of different clocks existing at the input stage is used thereafter. Thus, the stability of the system can be enhanced. By controlling the weighting factor to be optimum, the number of multipliers can be reduced, thereby reducing the scale of the entire circuit.

Thus, the invention described herein makes possible the advantages of (1) providing a video signal format conversion apparatus operating at a relatively small capacity of hardware by effectively using the hardware; and (2) providing a video signal format conversion apparatus having little crosstalk or other problems.

These and other advantages of the present invention will become apparent to those skilled in the art upon reading and understanding the following detailed description with reference to the accompanying figures.

BRIEF DESCRIPTION OF THE DRAWINGS

FIG. 10 is a schematic view illustrating data structures of an input signal and an output signal in the block diagram of a video signal format conversion apparatus shown in FIG. 9;

FIG. 21 is a view illustrating the positional relationship between the sampling data obtained from an input signal and the sampling data obtained from an output signal; and FIG. 22 is a view illustrating data streams of various parts of the conventional video signal format conversion apparatus.

DESCRIPTION OF THE PREFERRED EMBODIMENTS

Figure 1:
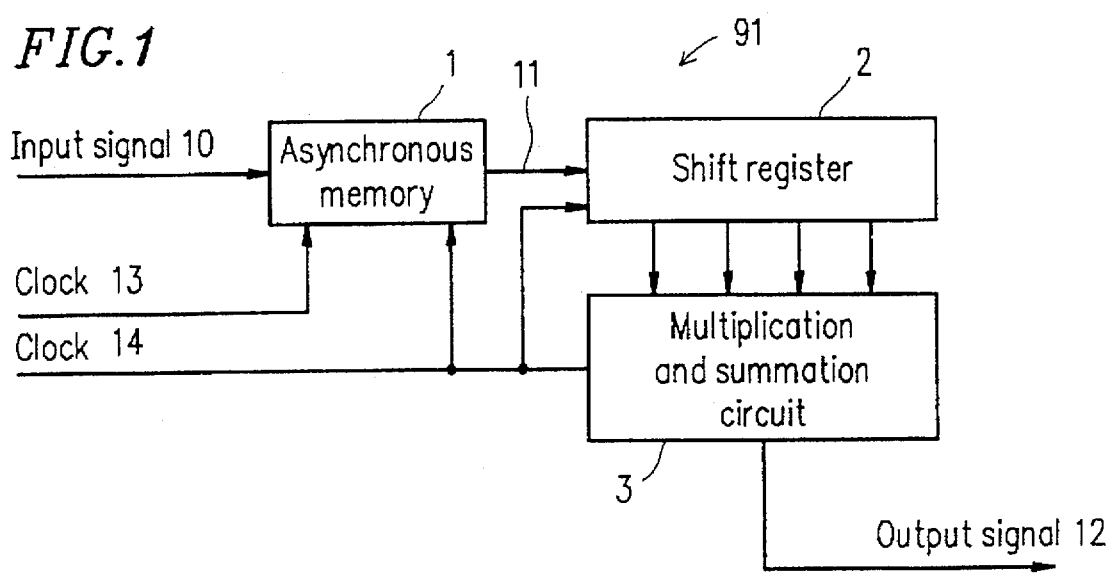
FIG. 1 is a block diagram of a video signal format conversion apparatus in a first example according to the present invention.

Hereinafter, the present invention will be described by way of illustrative examples with reference to the accompanying drawings. The same reference numerals designate the same component.

EXAMPLE 1

FIG. 1 is a block diagram of a video signal format conversion apparatus 91 in a first example according to the present invention. The operation of the video signal format conversion apparatus 91 will be described together with the structure thereof.

An asynchronous memory 1 receives and temporarily stores an input signal 10. The input signal 10, which is a digitized video signal, contains digital data representing the luminance of each of pixels in the case of monochrome display. The luminance is represented by an integer in the range of, for example, 0 through 255. In the following description, the digitized video signal is for monochrome display for simplicity, but can be for color display. In the case of color display, the digital data represents the luminance of each pixel for RGB (red, green, blue) colors.

The data is written in the asynchronous memory 1 using a clock 13 (writing clock) and read from the asynchronous memory 1 using a clock 14 (reading clock). The frequency of each of the clocks 13 and 14 can be arbitrarily selected. In general, it is not necessary that the clock frequencies of the writing clock and the reading clock should be different from each other. According to the present invention, such frequencies are different. The clock 13 is synchronous with the input signal 10, and the clock 14 is synchronous with the output signal 12.

A shift register 2 receives a signal 11 from the asynchronous memory 1, sequentially shifts the data represented by the signal 11, and outputs the resultant signal. The timing for shifting is based on the clock 14.

The multiplication and summation circuit 3 receives the four shifted data, multiplies each data by their respective weighting factors and summates the resultant values. The obtained value is output as the output signal 12.

Hereinafter, conversion of a signal representing 1440 dots/line into a signal representing 1920 dots/line will be described. Such conversion is a horizontal 3→4 conversion.

Figure 2:
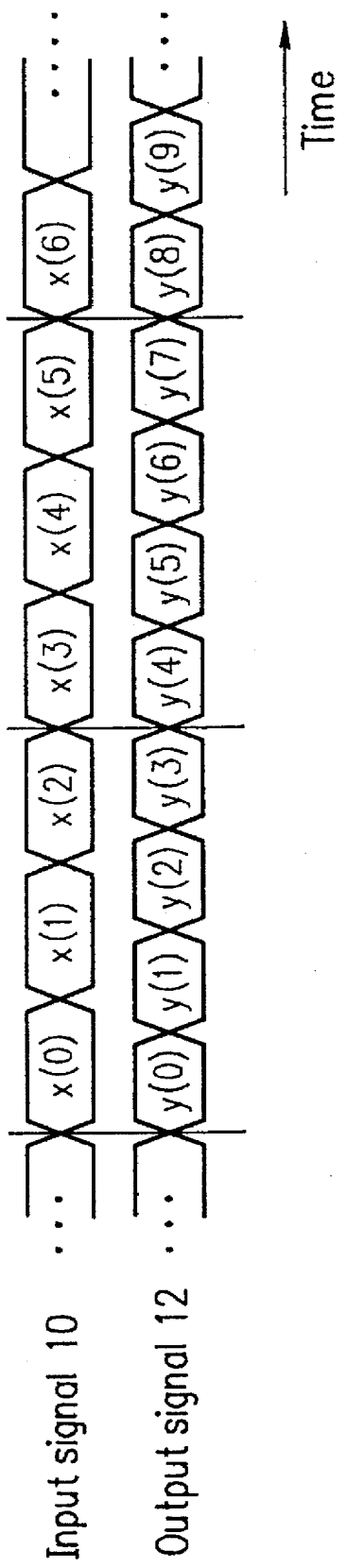
FIG. 2 is a timing diagram of sampling data obtained from an input signal and an output signal.

FIG. 2 is a timing diagram of sampling data obtained from the input signal 10 and the output signal 12. Pixel data represented by the input signal 10 is indicated as x(n) (n: integer); and pixel data represented by the output signal 12 is indicated as y(n) (n: integer). The integer n is sequentially allocated to the pixels on the scanning line on the display screen. In the case of monochrome display, the value of each pixel represented by the signals 10 and 12 corresponds to, for example, the luminance of the pixel. When the luminance is represented by 8 bits, the x(n) and y(n) each can be a value in the range of 0 through 255. The three-dot pixel data represented by the digitized video input signal 10 is converted into four-dot pixel data represented by the output signal 12.

Figure 3:
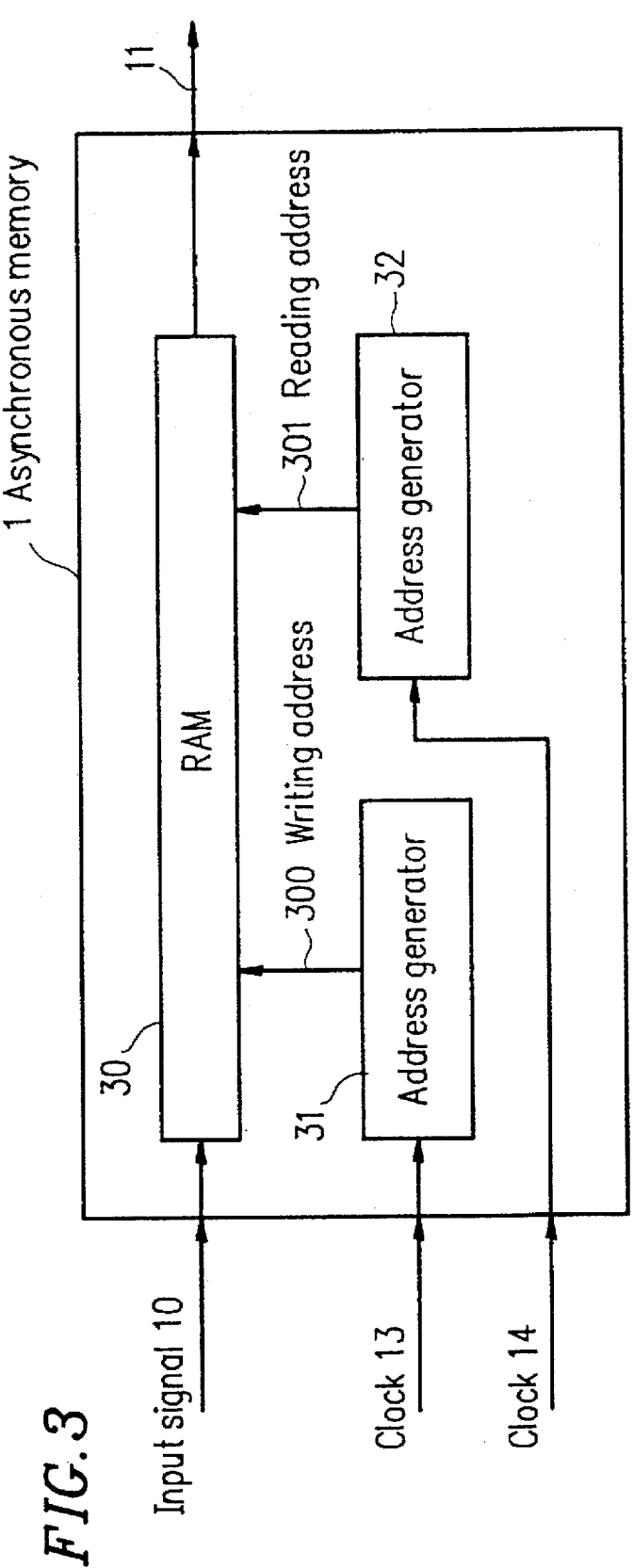
FIG. 3 is a block diagram of an asynchronous memory included in the video signal format conversion apparatus shown in FIG. 1.

FIG. 3 is a block diagram of the asynchronous memory 1. As is shown in FIG. 3, the asynchronous memory 1 includes a RAM (random access memory) 30 for separately designating a writing address and a reading address, a writing address generator 31 for generating a writing address 300 to be sent to the RAM 30, and a reading address generator 32 for generating a reading address 301 to be sent to the RAM 30. The writing address generator 31 is driven by the clock 13 synchronous with the input signal 10, and the reading address generator 32 is driven by the clock 14 synchronous with the output signal 12.

The input signal 10 which is sent to the asynchronous memory 1 is temporarily stored in the RAM 30. The address for storing the input signal 10 is indicated by the writing address 300 generated by the writing address generator 31. When the reading address signal 301 generated by the reading address generator 32 indicates the same address as is by the writing address 300, the data represented by the input signal 10 is output as the signal 11.

Figure 4:
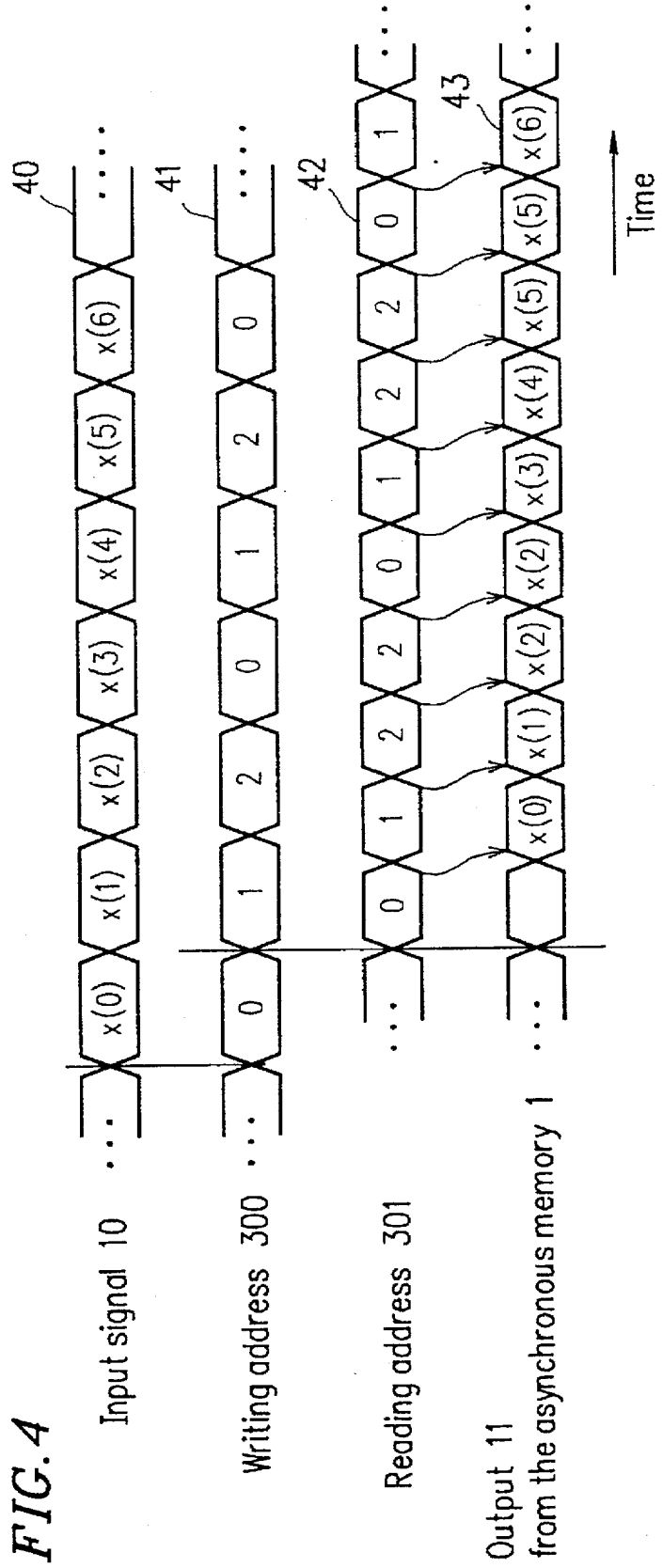
FIG. 4 is a timing diagram of signals related to the asynchronous memory shown in FIG. 3.

FIG. 4 is a timing diagram of the input signal 10 (indicated by data stream 40), the writing address 300 (indicated by data stream 41), the reading address 301 (indicated by data stream 42), and the output 11 from the asynchronous memory 1 (indicated by data stream 43), for performing the horizontal 3→4 conversion. The symbol x(n) (n: integer) represents the data contained in the input signal 10 and the signal 11 output over time.

The writing address generator 31 operates so that an address value represented by the writing address signal 300 will change in cycle as 0→1→2→0→. . . . The address generator 32 operates so that an address value represented by the reading address signal 301 will change in cycle as 0→1→2→2→0→. . . . As a result, the asynchronous memory 1 outputs the signal 11 shown by data stream 43.

The signal 11 output from the asynchronous memory 1 is input to the shift register 2. In this example, three addresses "0", "1" and "2", for example, are sufficient for the asynchronous memory 1 because the asynchronous memory 1 is used for storing data corresponding to three pixels.

Figure 5:
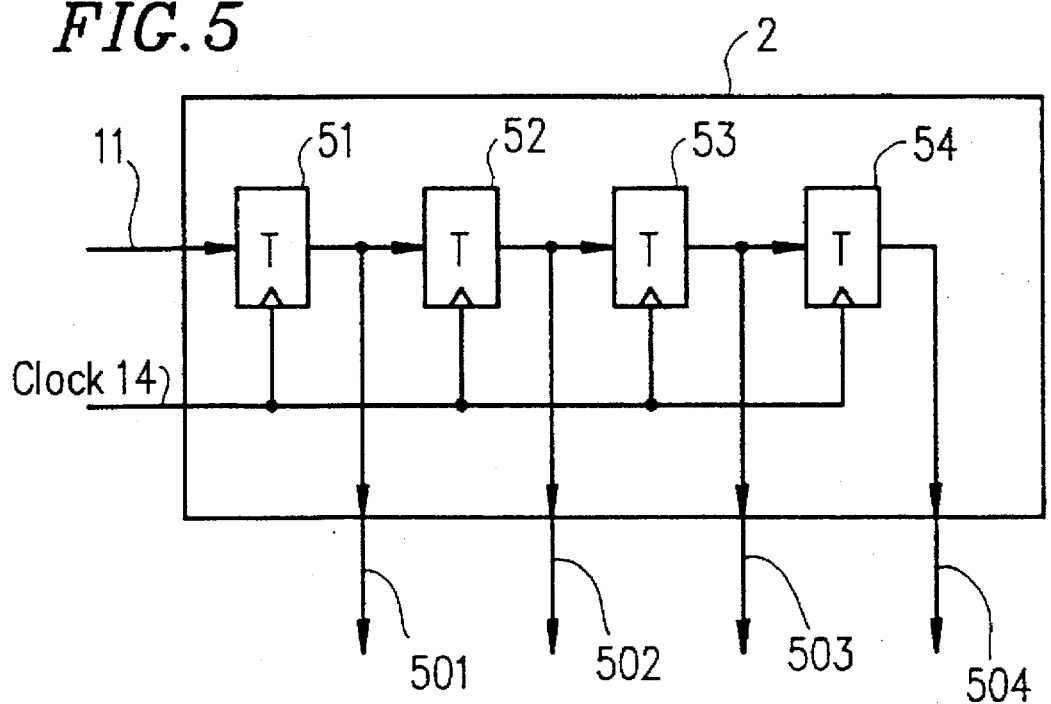
FIG. 5 is a block diagram of a shift register included in the video signal format conversion apparatus shown in FIG. 1.

FIG. 5 is a block diagram of the shift register 2. As is shown in FIG. 5, the shift register 2 includes latches 51, 52, 53 and 54 for temporarily storing the output 11 from the asynchronous memory 1.

The latches 51 through 54, which are driven by the clock 14, temporarily store the output 11 for respectively output delayed signals 501 through 504 to the multiplication and summation circuit 3.

As is described above, the number of taps for operation performed by the low-pass filter for sampling frequency conversion is 11 in this example. Also as is described above, the weighting factors are symmetrical and are assumed to be:

$$k(5), k(4), k(3), k(2), k(1), k(0), k(1), k(2), k(3), k(4), k(5) \qquad (6)$$

Figure 6:
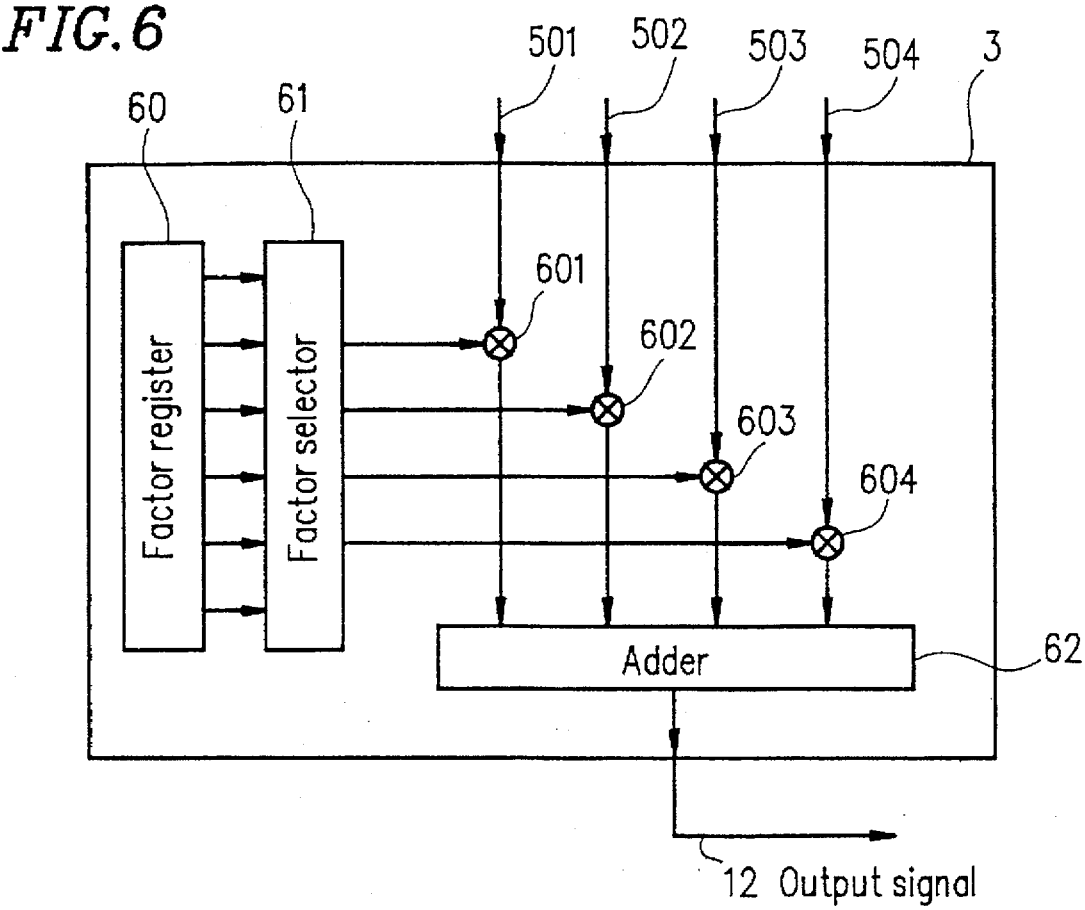
FIG. 6 is a block diagram of a multiplication and summation circuit included in the video signal format conversion apparatus shown in FIG. 1.

FIG. 6 is a block diagram of the multiplication and summation circuit 3. As is shown in FIG. 6, the multiplication and summation circuit 3 includes a factor register 60 for storing the six weighting factors k(0), k(1), k(2), k(3), k(4) and k(5) and value 0, a factor selector 61 for selecting necessary factors among the six weighting factors stored in the factor register 60, multipliers 601 through 604, and an adder 62. The multipliers 601 through 604 respectively multiply the outputs 501 through 504 by the corresponding weighting factors, and the adder 62 summates the outputs from the multipliers 601 through 604 and outputs the resultant value as the output signal 12.

All the circuits in the multiplication and summation circuit 3 are driven by the clock 14. The relationship between the input signal 10 and the output signal 12 obtained by the horizontal 3→4 conversion is as shown in FIG. 21. The data x(n) are represented by the input signal 10, and the data y(n) are represented by the output signal 12. As is mentioned in the description of the related art, the data y(0) is obtained by expression (2).

Assuming that the output 501 is x(1), the output 502 is x(0), the output 503 is x(−1), and the output 504 is x(−1), the multiplication and summation circuit 3 operates so as to multiply the output 501 by k(4), the output 502 by k(0), and the output 503 by k(4) and to summate the resultant values. In this manner, y(0) can be obtained.

When the outputs 501 through 504 proceed by one more clock synchronously with the clock 14, the output 501 is x(2), the output 502 is x(1), the output 503 is x(0), and the output 504 is x(−1). At this time, y(1) is obtained by expression (3). The multiplication and summation circuit 3 operates so as to multiply the output 501 by k(5), the output 502 by k(1), and the output 503 by k(3) and to summate the resultant values. In this manner, y(1) can be obtained.

When the outputs 501 through 504 proceed by still one more clock synchronously with the clock 14, the output 501 is x(2), the output 502 is x(2), the output 503 is x(1), and the output 504 is x(0). At this time, y(2) is obtained by expression (4). The multiplication and summation circuit 3 operates so as to multiply the output 502 by k(2) and the output 503 by k(2) and to summate the resultant values. In this manner, y(2) can be obtained.

When the outputs 501 through 504 proceed by yet another one more clock synchronously with the clock 14, the output 501 is x(3), the output 502 is x(2), the output 503 is x(2), and the output 504 is x(1). At this time, y(3) is obtained by expression (5). The multiplication and summation circuit 3 operates so as to multiply the output 501 by k(3), the output 502 by k(1) and the output 504 by k(5) and to summate the resultant values. In this manner, y(3) can be obtained.

For obtaining y(4) through y(n), the manner for obtaining y(0) through y(3) are repeated. In this manner, the output signal 12 of the time series after conversion is obtained. In the video signal format conversion apparatus 91 in this example, the clock 13 synchronous with the input signal 10 is used only in an input stage of the asynchronous memory 1 and all the other stages of the circuit are driven by the clock 14 synchronous with the output signal 12.

EXAMPLE 2

Figure 7:
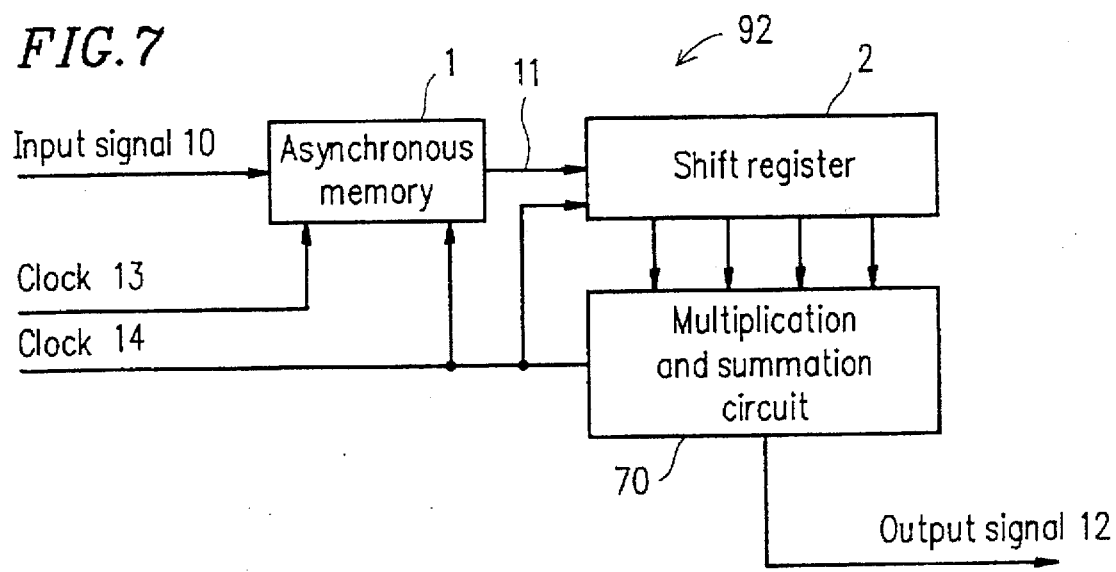
FIG. 7 is a block diagram of a video signal format conversion apparatus in a second example according to the present invention.

FIG. 7 is a block diagram of a video signal format conversion apparatus 92 in a second example according to the present invention. The operation of the video signal format conversion apparatus 92 will be described together with the structure thereof.

The video signal format conversion apparatus 92 has the same structure as that of the video signal format conversion apparatus 91 in the first example except that the former includes a multiplication and summation circuit 70 in place of the multiplication and summation circuit 3.

Figure 8:
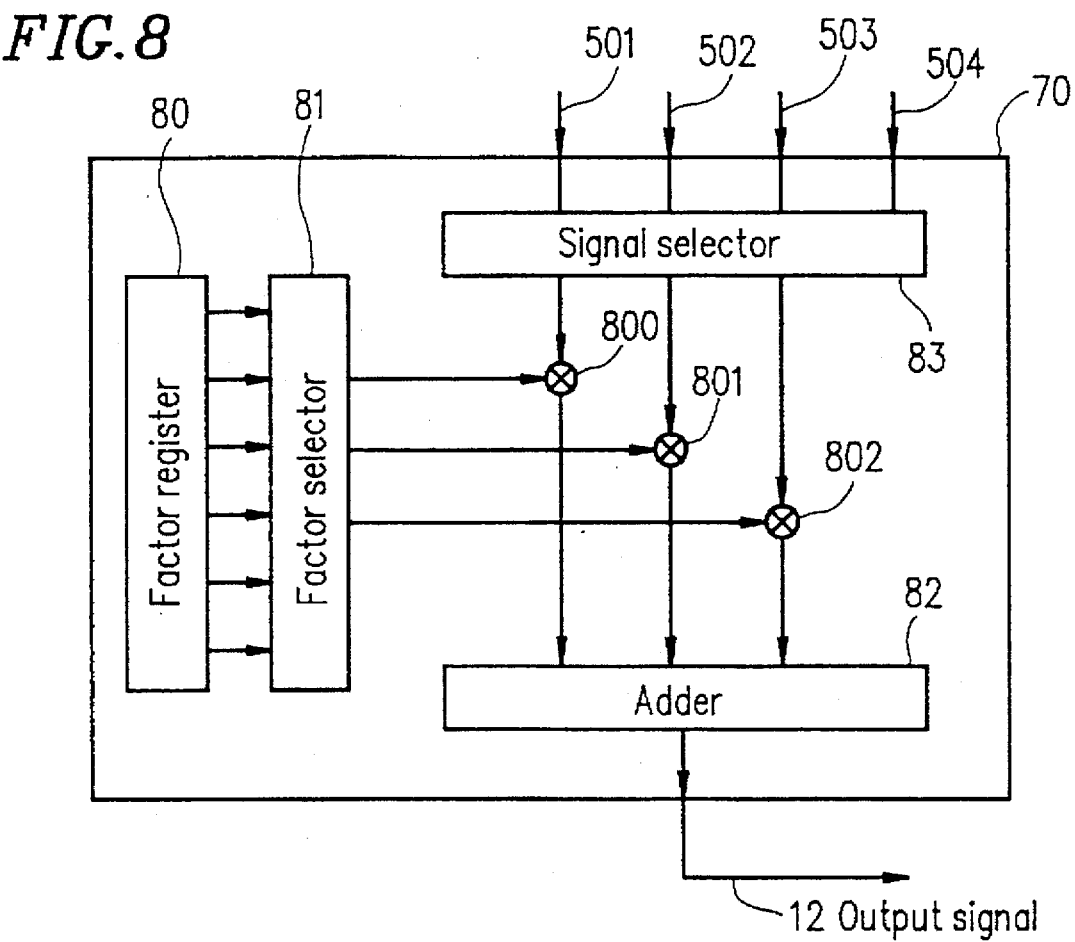
FIG. 8 is a block diagram of a multiplication and summation circuit included in the video signal format conversion apparatus shown in FIG. 7.

FIG. 8 is a block diagram of the multiplication and summation circuit 70. As is shown in FIG. 8, the multiplication and summation circuit 70 includes a factor register 80 for storing weighting factors, a factor selector 81 for selecting necessary factors among the weighting factors stored in the factor register 80, a signal selector 83 for selecting the necessary signals among the signals 501 through 504 from the shift register 2, multipliers 800 through 802 for respectively multiplying the signals selected by the signal selector 83 by their respective factors obtained by the factor selector 81, and an adder 82 for summating the multiplication results and outputting the result as the output 12.

In the first example, the horizontal 3→4 conversion is described by example. By each of expressions (2), (3), (4) and (5), multiplications are performed three times at the maximum. In the multiplication and summation circuit 3 in the first example, the signals 501, 502 and 503 are sufficient to obtain y(0) as is appreciated from expression (2). The multiplier 604 is not necessary among the four multipliers 601 through 604. For obtaining y(1), the multiplier 604 is not necessary; for obtaining y(3), the multipliers 601 and 604 are not necessary; and for obtaining y(4), the multiplier 603 is not necessary.

In the second example, the signal selector 83 selects only the necessary signals to be supplied to the multipliers 800 through 802 from the signals 501 through 504.

Table 2 shows which signals among signals 501 through 504 are selected for multipliers 800 through 802 by the signal selector 83 at various times.

TABLE 2

|     | t = 0   | t = 1 | t = 2 | t = 3   |
|-----|---------|-------|-------|---------|
| 800 | 501     | 501   | arb.  | 501     |
| 801 | 502     | 502   | 502   | 502/503 |
| 802 | 503/504 | 503   | 503   | 504     |

In table 2, "/" indicates either signal can be selected, and "arb." indicates an arbitrary value can be input.

Table 3 shows which factors are supplied to the multipliers 800 through 802 by the factor selector 81 at various times.

TABLE 3

|     | t = 0 | t = 1 | t = 2 | t = 3 |
|-----|-------|-------|-------|-------|
| 800 | k(4)  | k(5)  | 0     | k(3)  |
| 801 | k(0)  | k(1)  | k(2)  | k(1)  |
| 802 | k(4)  | k(3)  | k(2)  | k(5)  |

In Tables 2 and 3, t=0 represents the time when y(0), y(4) ... (generally, y(4m) where m is an integer) are obtained. Similarly, t=1 represents the time when y(1), y(5) ... (generally, y(4m+1)) are obtained; t=2 represents the time when y(2), y(6) ... (generally, y(4m+2)) are obtained; and t=3 represents the time when y(3), y(7) ... (generally, y(4m+3)) are obtained.

At time t=0, the multiplier 800 multiplies the signal 501 by the factor k(4), the multiplier 801 multiplies the signal 502 by the factor k(0); and the multiplier 802 multiplies, for example, the signal 503 by the factor k(4). As is described in the first example, the signals 501 through 503 respectively represent x(1), x(0) and x(−1). Thus, y(0) is obtained by expression (2). In the same manner, y(1), y(2) and y(3) at times t=1, t=2 and t=3 are also obtained.

The video signal format conversion apparatus 92 requires only three multipliers in order to perform the desired operation, instead of four multipliers required in the first example.

Referring to table 2, the signal to be input to the multiplier 800 at t=2 is arbitrary. In the case where the signal 501 is input to the multiplier 800 at t=2, it is not necessary to change the signal which is input to the multiplier 800 over time. In other words, the signal 501 can be input to the multiplier 800 without switching. Similarly, in the case where the signal 502 is input to the multiplier 801 at t=3, it is not necessary to change the signal which is input to the multiplier 801 over time. In other words, the signal 502 can be input to the multiplier 801 without switching. In this way, the configuration of the control circuit can be simplified.

In the first and the second example, the number of taps for operation performed by the low-pass filter for sampling frequency conversion is 11, and weighting factors are symmetrical as is shown in expression (1) by example. Since the number of taps and the weighting factors are related to only the frequency characteristic for band limitation, any other number of taps and other weighting factors can be used to achieve the same effects.

EXAMPLE 3

A video signal format conversion apparatus 93 in a third example according to the present invention will be described.

For simplicity, a progressive scan signal representing 1280×720 (horizontal×vertical) effective pixels (one frame: 1/60 second) will be converted into a 2:1 interlaced scan signal representing 1920×1080 effective pixels (one frame: 1/30 second).

Figure 9:
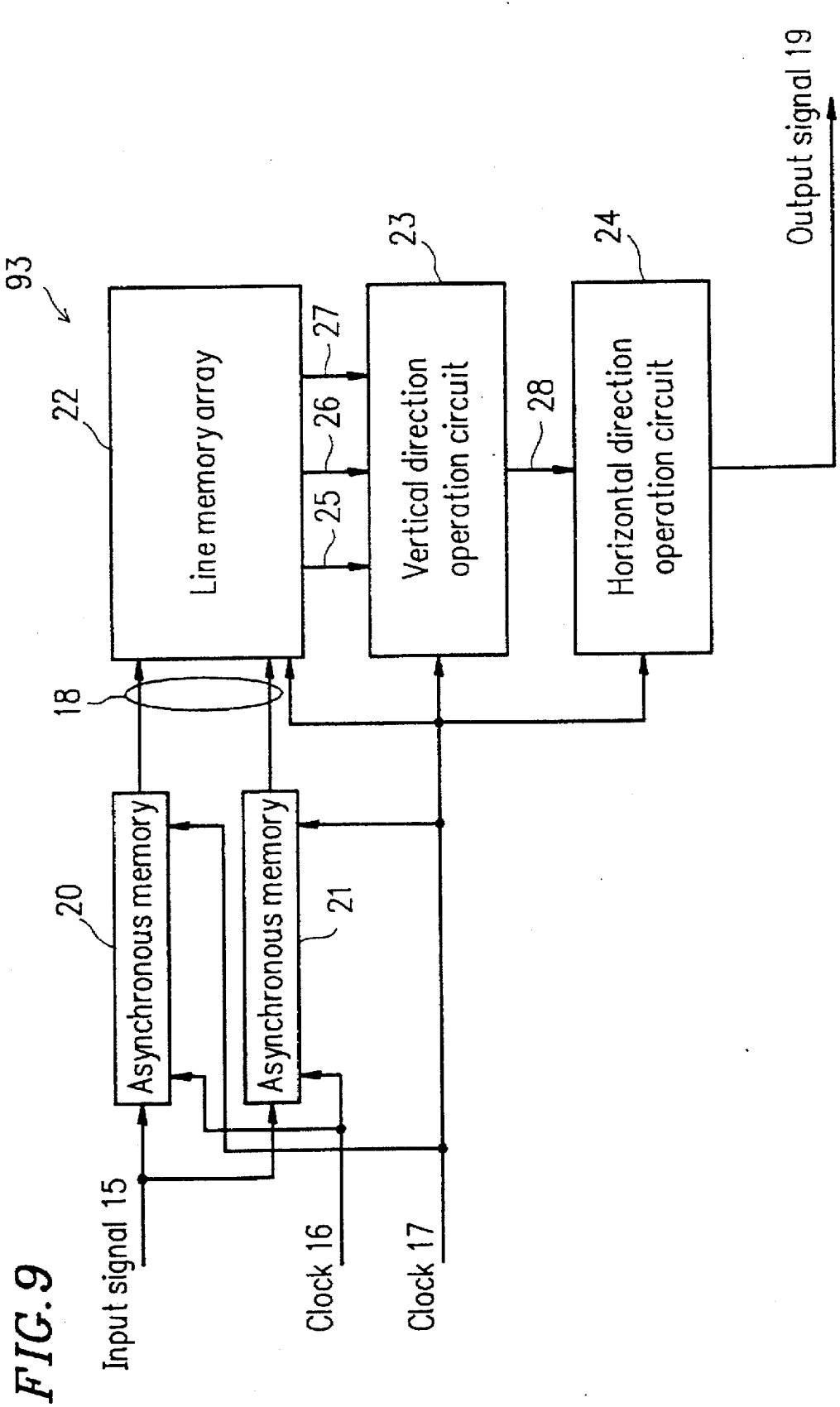
FIG. 9 is a block diagram of a video signal format conversion apparatus in a third example according to the present invention.

FIG. 9 is a block diagram of the video signal format conversion apparatus 93.

The video signal format conversion apparatus 93 includes asynchronous memories 20 and 21 for receiving an input signal 15 and performing writing and reading respectively by independent clocks 16 and 17, a line memory array 22 for temporarily storing several lines (three lines in this example) of an output 18 from the asynchronous memory 20 or 21, a vertical direction operation circuit 23 for performing operation in the vertical direction by multiplying outputs 25 through 27 from the line memory array 22 by their respective weighting factors and summating the resultant values, and a horizontal direction operation circuit 24 for performing operation of an output 28 from the vertical direction operation circuit 23 in the horizontal direction and generating an output signal 19.

The asynchronous memories 20 and 21, which have the same configuration as the asynchronous memory 1 in the first and the second examples, perform writing by the clock 16 synchronous with the input signal 15 and perform reading by the clock 17 synchronous with the output signal 19.

As is described above, the input signal 15 represents 1280×720 effective pixels. Generally, a horizontal blanking period and a vertical blanking period are necessary for scanning a video signal. Accordingly, the total number of pixels represented by the input signal 15 is more than the above-mentioned, and the pixels existing in the horizontal blanking period and the vertical blanking period are considered for converting the format of a video signal which is continuous in terms of time.

FIG. 10 is a schematic view illustrating a data structure of the input signal 15 and the output signal 19.

One frame of the input signal 15 represents data structure 100, and one line of the input signal 15 represents data structure 101. The input signal 15 represents 1650×750 (horizontal×vertical) total pixels as opposed to 1280×720 effective pixels. One frame of the output signal 19 represents data structure 102, and one line of the output signal 19 represents data structure 103. The output signal 19 represents 2200×1125 (horizontal×vertical) total pixels as opposed to 1920×1080 effective pixels. Accordingly, the clock frequency for each dot (pixel) before conversion is:

$$1650 \times 750 \times 60 = 74.25 \text{ MHz} \quad (7)$$

The clock frequency for each dot after conversion is:

$$2200 \times 1125 \times 30 = 74.25 \text{ MHz} \quad (8)$$

As is appreciated, the clock frequencies obtained by expressions (7) and (8) are equal to each other. Therefore, in this case, the clocks 16 and 17 have the same frequency.

Figure 11:
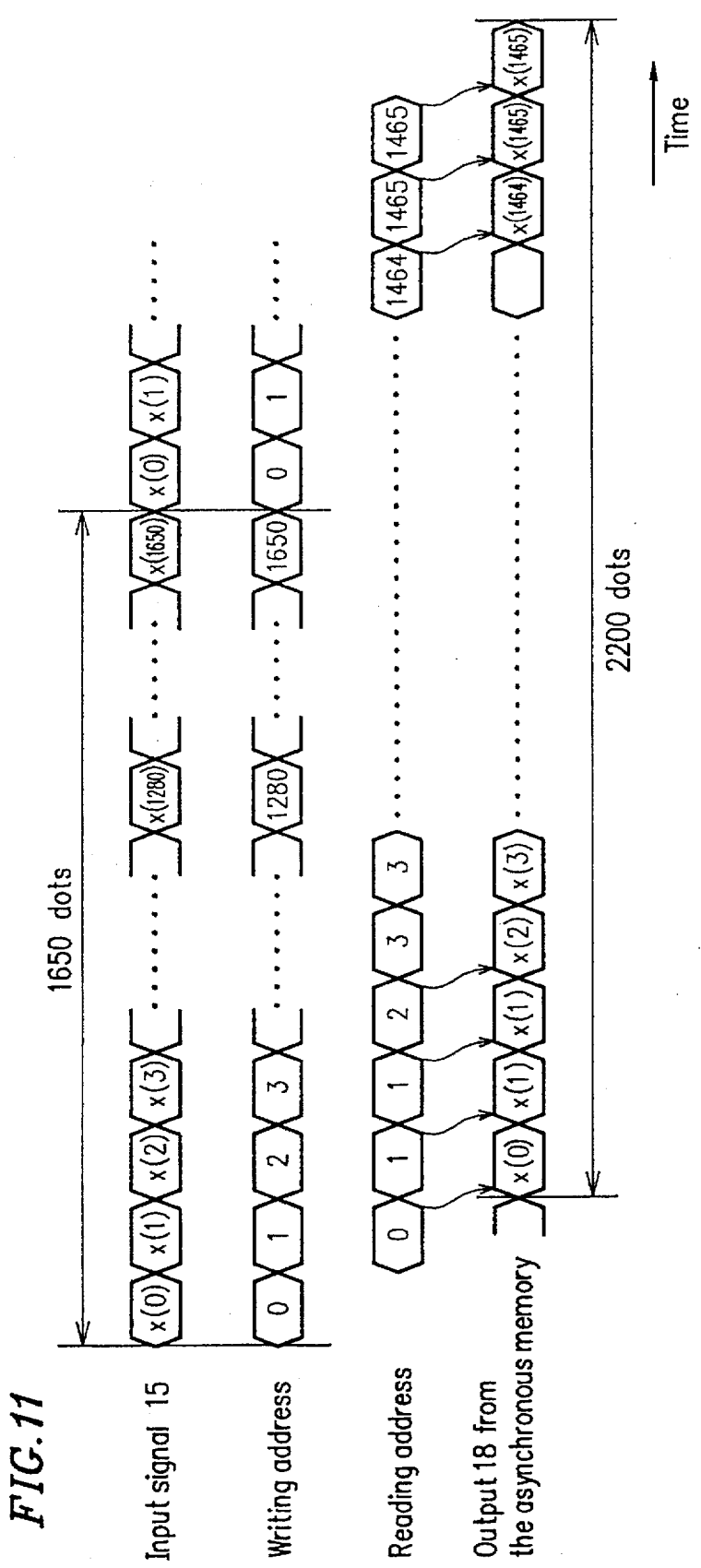
FIG. 11 is a timing diagram illustrating signals input to and output from asynchronous memories included in the video signal format conversion apparatus shown in FIG. 9.

FIG. 11 is a timing diagram of the input signal 15, a writing address, a reading address, and a signal 18 output from the asynchronous memories 20 and 21. The symbol x(n) represents the data which indicates the pixel value represented by the input signal 15 (n: integer). The integer n is numbered in accordance with the pixels which are progressively scanned. The writing address of the asynchronous memories 20 and 21 changes in cycle as $0 \rightarrow 1 \rightarrow 2 \rightarrow 3 \rightarrow 4 \rightarrow \ldots \rightarrow 1650 \rightarrow 0 \rightarrow 1 \rightarrow \ldots$ . The reading address changes in cycle as $0 \rightarrow 1 \rightarrow 1 \rightarrow 2 \rightarrow 3 \rightarrow 3 \rightarrow 4 \rightarrow 5 \rightarrow 5 \rightarrow$ . $\rightarrow 1464 \rightarrow 1465 \rightarrow 1465 \rightarrow 0 \rightarrow 1 \rightarrow$ . . . . In short, data for 2200 dots are generated by reading the odd-numbered writing addresses twice. The data written in the writing addresses 0 through 1465 are read as the data for 2200 dots (corresponding to 2200 reading clocks), namely, as the data for one line.

While there are 0 through 1650 writing addresses, there are only 0 through 1465 reading addresses. However, the data in the 0 through 1280 writing addresses storing the data for the effective pixels are all read, and therefore the resultant image does not lack any part.

Figure 12:
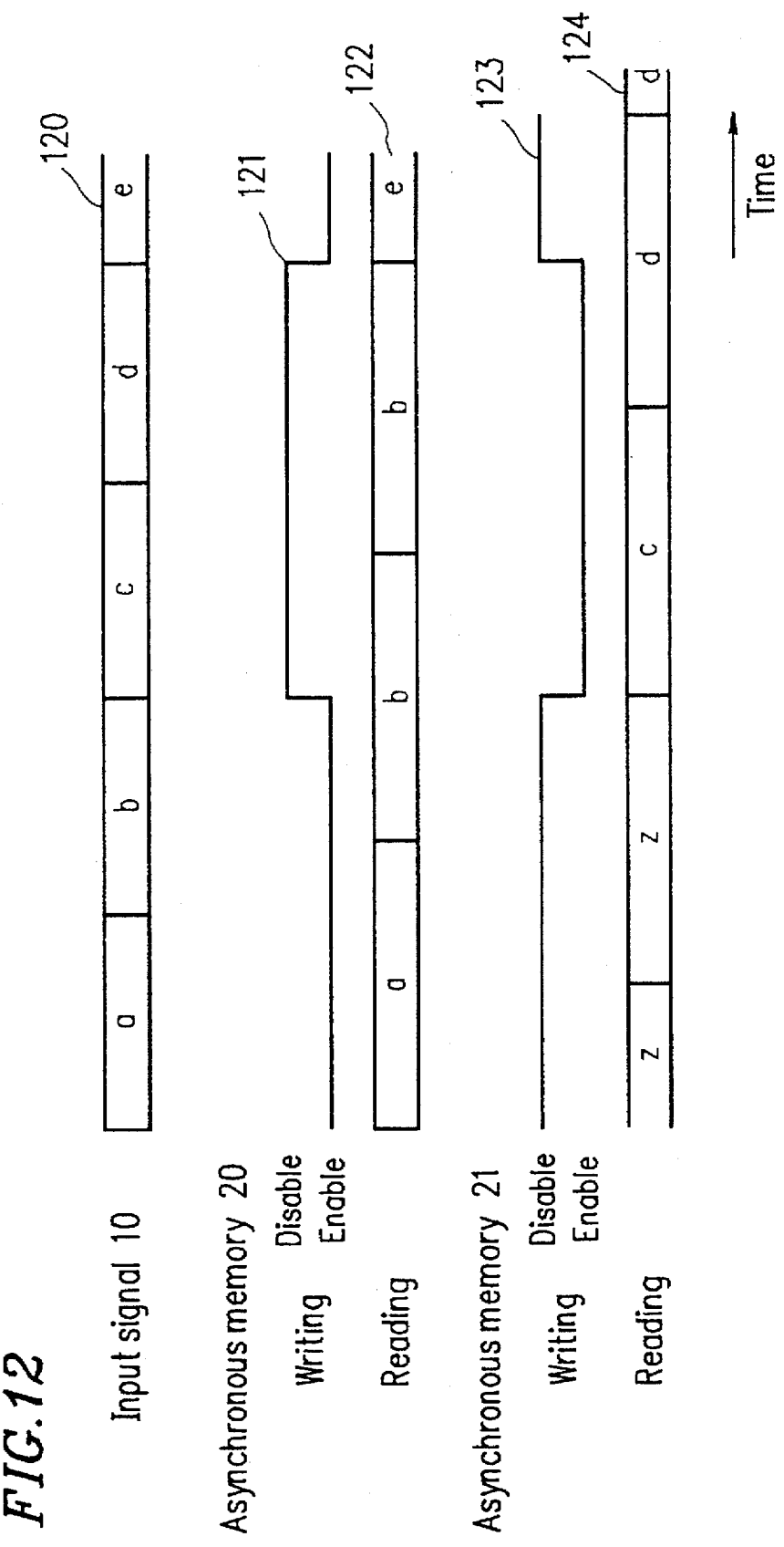
FIG. 12 is a timing diagram illustrating the operation of the asynchronous memories.

FIG. 12 is a timing diagram illustrating the operation of the asynchronous memories 20 and 21. In detail, FIG. 12 illustrates the data streams of the signals input to and output from the asynchronous memories 20 and 21 line by line. Data representing the lines are referred to as data a, data b, data c, data d, . . . . The data a is the oldest in terms of time. The horizontal axis represents time.

Data stream 120 indicates the input signal 15. The period in which data a in the data stream 120 is obtained corresponds to 1650 dots at a frequency of 74.25 MHz, namely, one line.

Waveform 121 represents write enable signal WE to the asynchronous memory 20. Only during the period when waveform 121 indicates "enable", writing to the corresponding address in the asynchronous memory 20 is performed. Data stream 122 indicates the data read from the asynchronous memory 20. The period in which data a in data stream 122 is obtained corresponds to 2200 dots at a frequency of 74.25 MHz. Since 1650:2200=3:4, during the period in which the data corresponding to four lines of the input signal 15 are input, data corresponding to three lines are output from the asynchronous memory 20.

Data is not written during a certain period. In such a case, the data corresponding to the same two lines are read. Waveform 123 indicates enable/disable of writing to the asynchronous memory 21. Data stream 124 indicates the data read from the asynchronous memory 21.

During the period in which the data corresponding to four lines of the input signal 15 are input, data corresponding to three lines are output from the asynchronous memory 21. Data is not written during a certain period. In such a case, the data corresponding to the same two lines are read.

In the above-described manner, one line including 1650 pixels is converted into one line including 2200 pixels under the condition that the writing clock 16 and the reading clock 17 both have the same frequency of, for example, 74.25 MHz. By such conversion, the number of pixels in the horizontal direction increases to 4/3, and thus the number of lines in each field decreases to ¾. However, the video signal before conversion (progressive scan signal) includes 750 lines in the vertical direction, and the video signal after conversion (interlaced scan signal) includes 1125 lines in the vertical direction. The number of lines before conversion corresponds to 1500 lines of an interlaced scan signal. As is appreciated, the above-mentioned conversion is performed so as to decrease the number of lines to ¾ (1500 lines to 1125 lines). Accordingly, the resultant image does not lack any part.

Further, since three lines are output while four lines are input, the input signal and the output signal are synchronized with certainty based on the unit of four input lines (namely, three output lines).

In this manner, the two asynchronous memories 20 and 21 each generate the output signal 18, by the clock 17 having the same data rate as the output signal 19.

Figure 13:
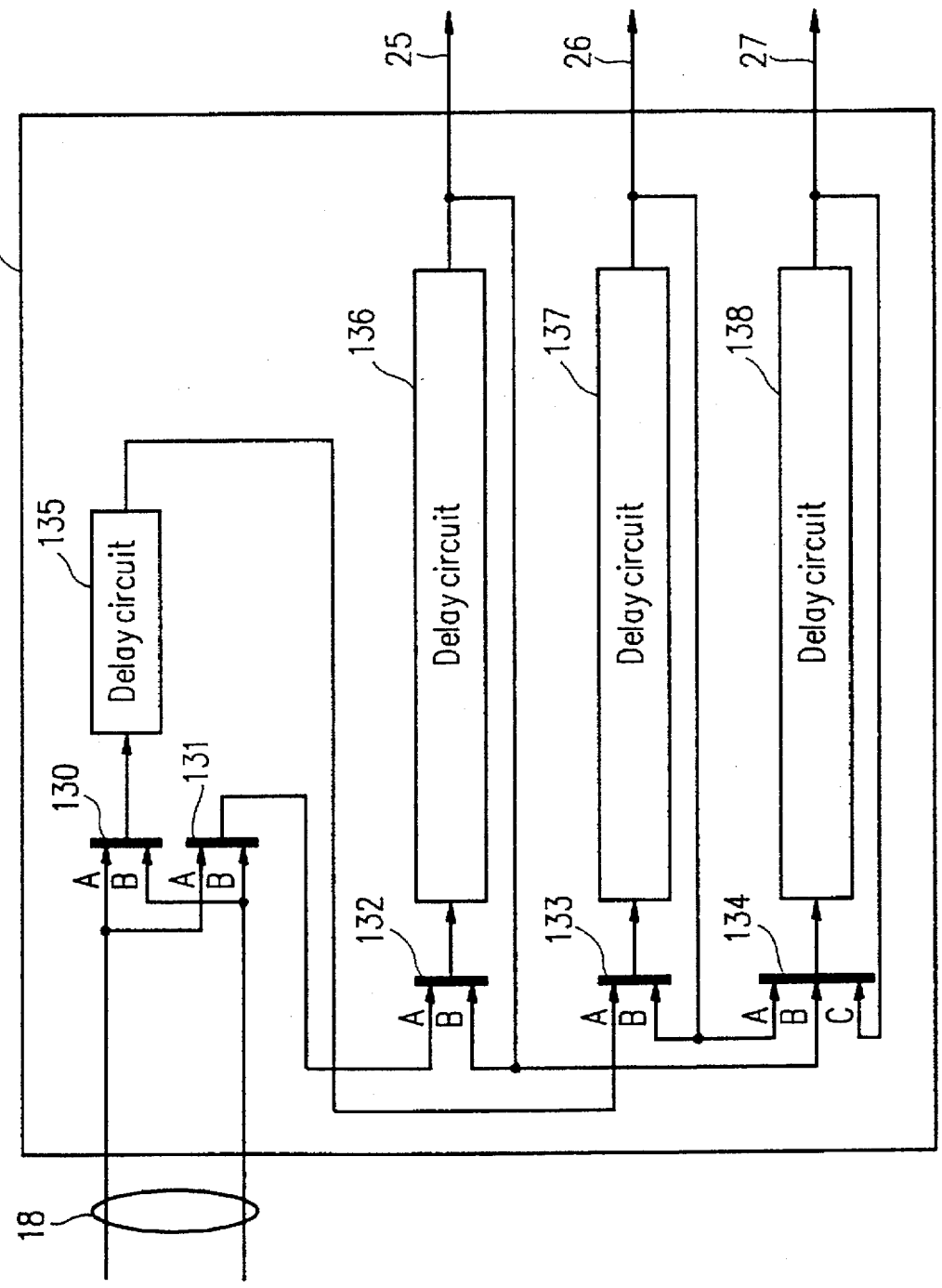
FIG. 13 is a block diagram of a line memory array included in the video signal format conversion apparatus shown in FIG. 9.

The two output signals 18 are sent to the line memory array 22, which is driven by the clock 17. FIG. 13 is a block diagram of the line memory array 22. The line memory array 22 includes selectors 130 and 131 for selecting one of the two output signals 18 and a delay circuit 135. Selectors 132 and 133 select one of two input signals and output the selected input signal. Selector 134 selects one of three input signals and output the selected input signal.

As is shown in FIG. 12, the timing at which a set of data is output from the asynchronous memory 20 is different from the timing at which the same data is output from the asynchronous memory 21. The delay circuit 135 delays the data output from the selector 130 in order to match such outputting timing. In this example, the output from the selector 130 is delayed by a period corresponding to 1100 dots, which is half of one line including 2200 dots.

The line memory array 22 further includes delay circuits 136 through 138 for temporarily storing data corresponding to one line. The delay circuits 136 through 138 respectively generate the outputs 25 through 27 shown in FIG. 9.

Figure 14:
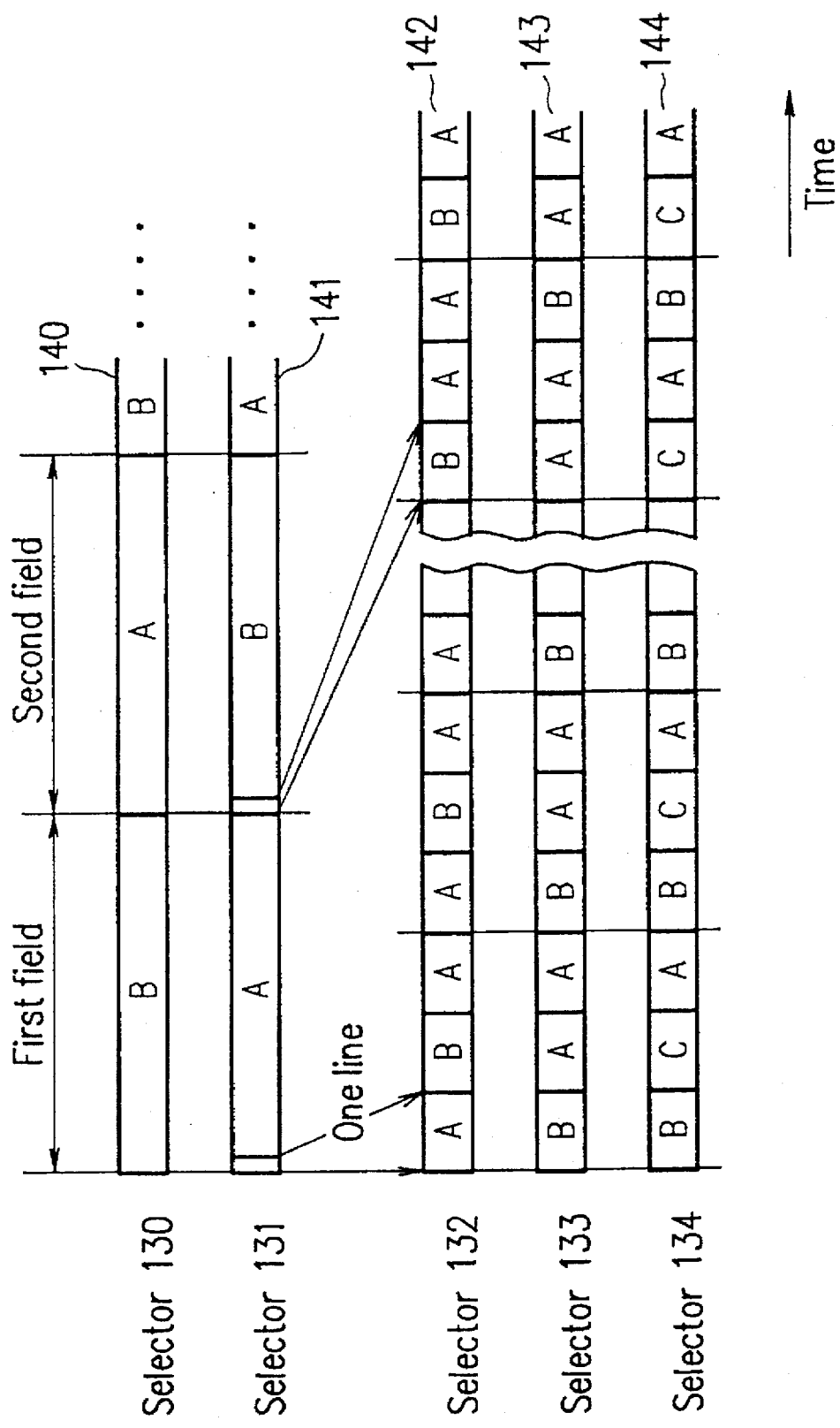
FIG. 14 is a timing diagram illustrating the manner of controlling selectors included in the line memory shown in FIG. 13.

Selectors 130 through 134 in the line memory array 22 are controlled as is illustrated in FIG. 14. Data streams 140 through 144 respectively indicate the control timing for the signals from the selectors 130 through 134. In FIG. 14, letters "A" and "B" correspond to letters "A" and "B" in FIG. 13. Either "A" or "B" is selected by the selectors 130 through 133. Either "A", "B", or "C" is selected by the selector 134.

It is to be noted that the signals selected by the selectors 132 through 134 in a first field are controlled in a different manner from the signals selected in a second field.

Figure 15:
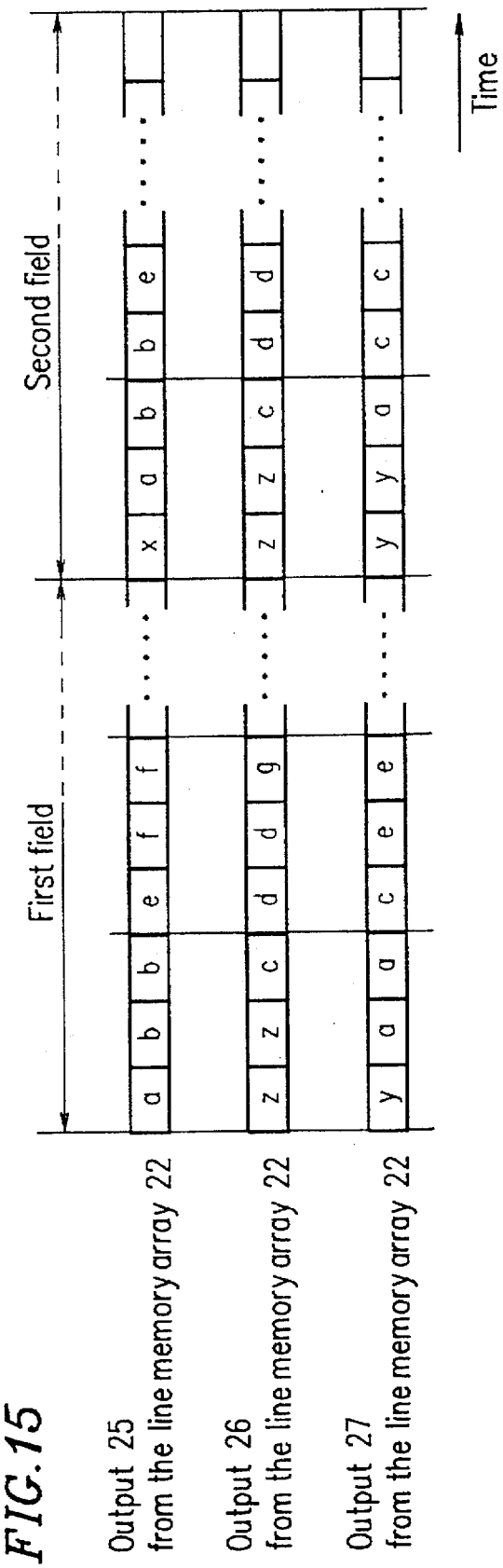
FIG. 15 is a timing diagram of signals output from the line memory array shown in FIG. 13.

FIG. 15 is a timing diagram illustrating the signals 25 through 27 output from the selectors 130 through 134 of the line memory array 22 as a result of the control shown in FIG. 14. The signals 25 through 27 are sent to the vertical direction operation circuit 23, which is driven by the clock 17.

Figure 16:
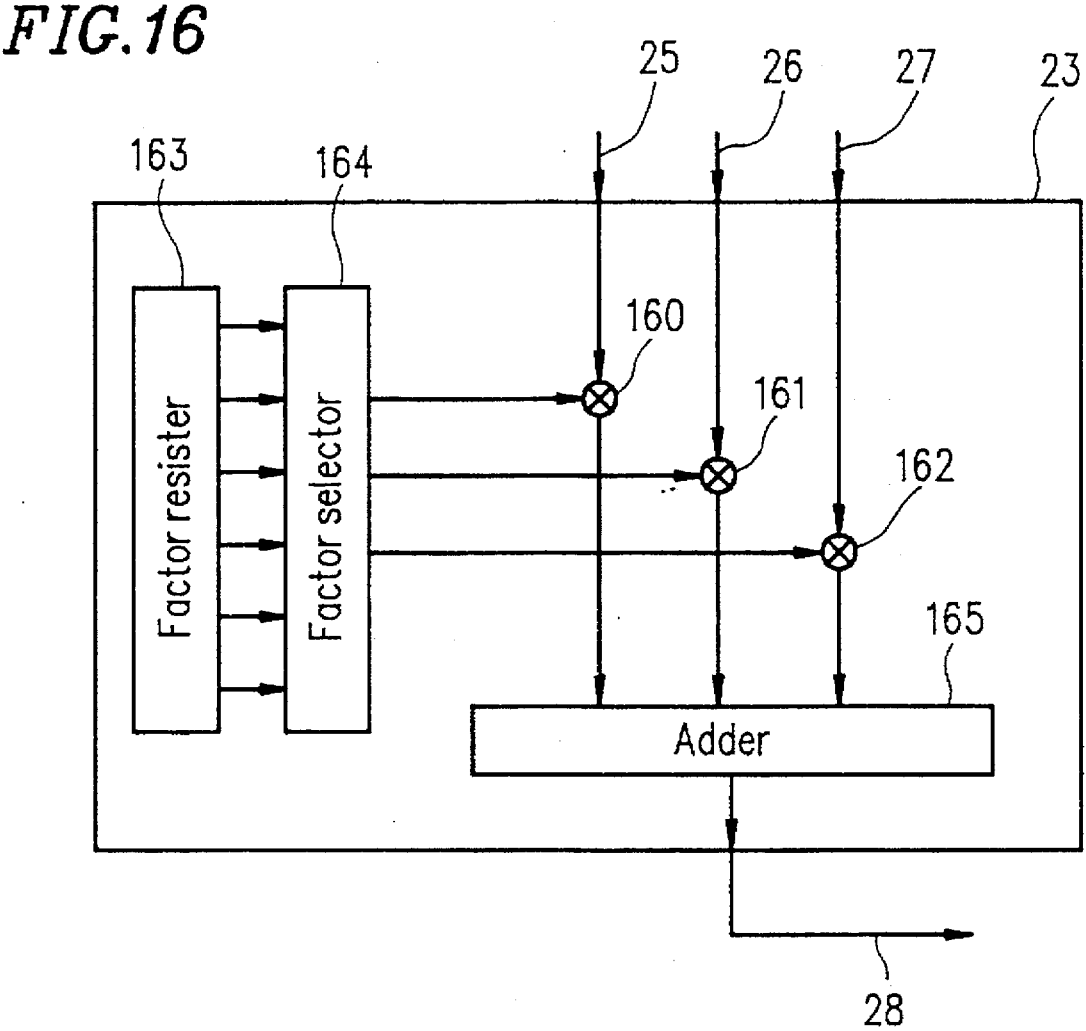
FIG. 16 is a block diagram of a vertical direction operation circuit included in the video signal format conversion apparatus shown in FIG. 9.

FIG. 16 is a block diagram of the vertical direction operation circuit 23. The vertical direction operation circuit 23 includes a factor register 163 for storing weighting factors, a weighting factor selector 164 for selecting the necessary factors among the outputs from the factor register 163, multipliers 160 through 162 for respectively multiplying the outputs 25 through 27 by their respective weighting factors, and an adder 165 for summating the multiplication results from the multipliers 160 through 162 to generate the output 28 shown in FIG. 9. An output of the adder 165 is the output 28 of the vertical direction operation circuit 23.

Figure 17:
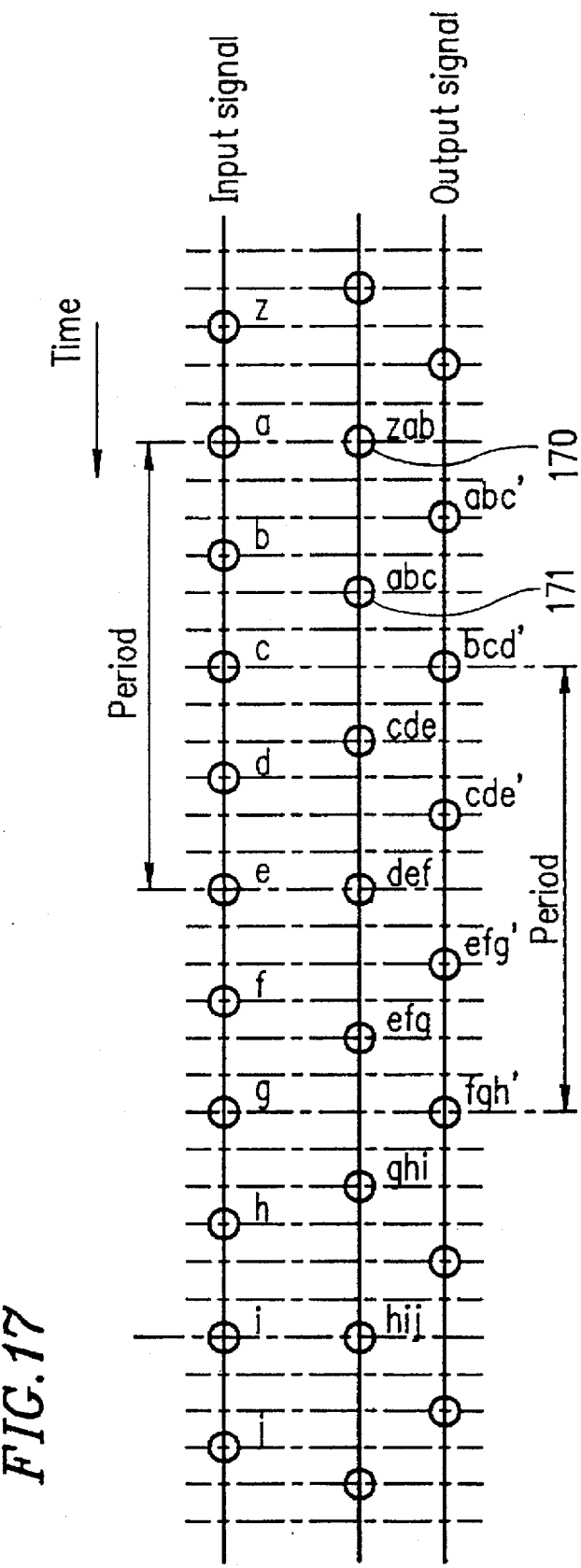
FIG. 17 is a timing diagram illustrating the operation of the vertical direction operation circuit shown in FIG. 16.

FIG. 17 is a timing diagram illustrating the operation of the vertical direction operation circuit 23. In detail, FIG. 17 shows the necessary input lines required for calculating the output lines in the case where a nine-tap filter is used for performing vertical 4→3 conversion. Circles 170 and 171 each represent one line. Data for lines z, a and b are required for calculating the line 170; and data for lines a, b and c are required for calculating the line 171. Such data required for calculation correspond to the line signals as the outputs 25 through 27 shown in FIG. 15. As is appreciated from this, the vertical direction operation is performed by multiplying the signals 25 through 27 by their respective weighting factors and summating the resultant values. In other words, the output signal 28 from the vertical direction operation circuit 23 is obtained as the result of the format conversion in the vertical direction.

For example, the low-pass filter used for the vertical direction conversion has the following nine taps and weighting factors are symmetrical as expressed by expression (9).

$$k(4), k(3), k(2), k(1), k(0), k(1), k(2), k(3), k(4) \quad (9)$$

The factor register 163 stores these five factors. The factor selector 164 selectively sends the weighting factors from the factor register 163 to the multipliers 160 through 162. The multipliers 160 through 162 respectively multiply the signals 25 through 27 by their respective weighting factors. The adder 165 summates the multiplication results and outputs the result as the output signal 28.

Hereinafter, a method for generating an output line based on an input line by the above-mentioned multiplication and summation (filtering) will be described with reference to FIG. 17.

When, for example, data representing the lines z, a and b are input as the input signals 25 through 27, the factor selector 164 sends k(3) to the multiplier 160, k(0) to the multiplier 161 and k(3) to the multiplier 162. The output line zab is calculated by expression (10).

$$[Line\ zab] = k(3) \times z + k(0) \times a + k(3) \times b \quad (10)$$

The values of pixels on the output line zab are each obtained by three pixel values having the same coordinate in the horizontal direction on the lines z, a and b.

Similarly, the output lines abc' and abc are obtained by expressions (11) and (12).

$$[Line\ abc'] = k(2) \times a + k(1) \times b + k(4) \times c \quad (11)$$

$$[Line\ abc] = k(4) \times a + k(1) \times b + k(2) \times c \quad (12)$$

The input signal 15 is a progressive scan signal, and the output signal 28 is an interlaced scan signal. Accordingly, one frame including the lines z, a, b, c, d, . . . represented by the input signal 15 is converted into a field including the lines zab, abc, cde, . . . and another field including the lines abc', bcd', cde' . . . represented by the signal 28.

Then, the horizontal direction operation circuit 24 receives the signal 28 from the vertical direction operation circuit 23 and converts the number of pixels in the horizontal direction. The horizontal direction operation circuit 24, which is also driven by the clock 17, has the structure obtained by connecting the shift register 2 shown in FIG. 5 and the multiplication and summation circuit 3 shown in FIG. 6. The signal 11 in FIG. 5 corresponds to the signal 28, and the output signal 12 corresponds to the output signal 19.

Figure 18:
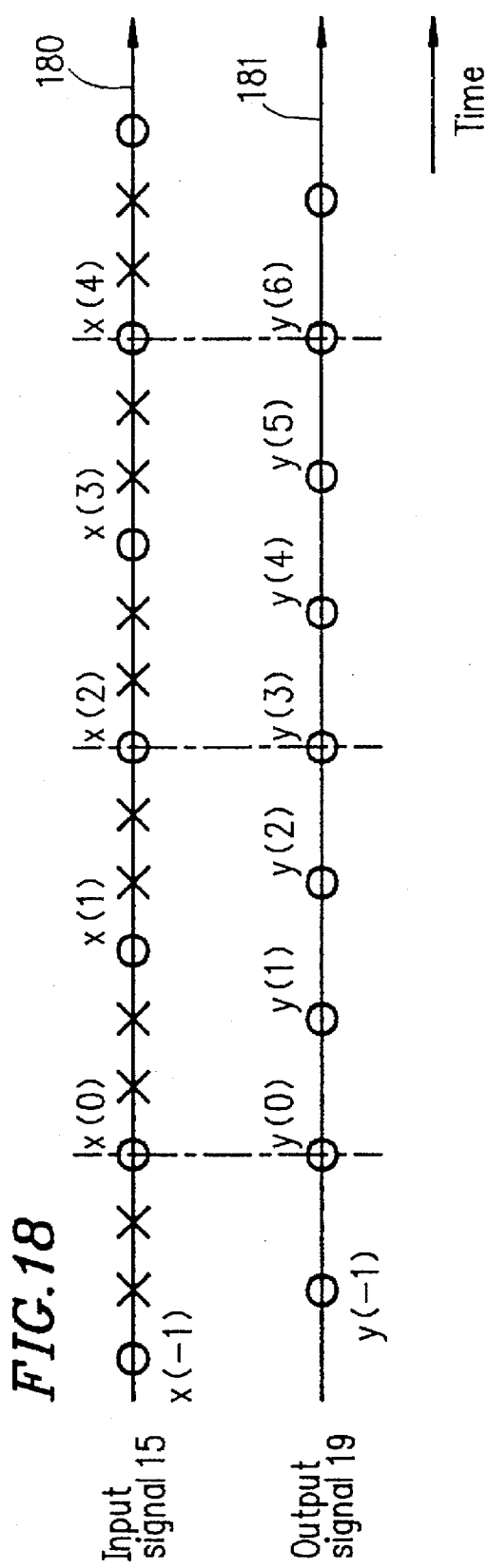
FIG. 18 is a timing diagram illustrating the operation of a horizontal direction operation circuit included in the video signal format conversion apparatus shown in FIG. 9.
Figure 19:
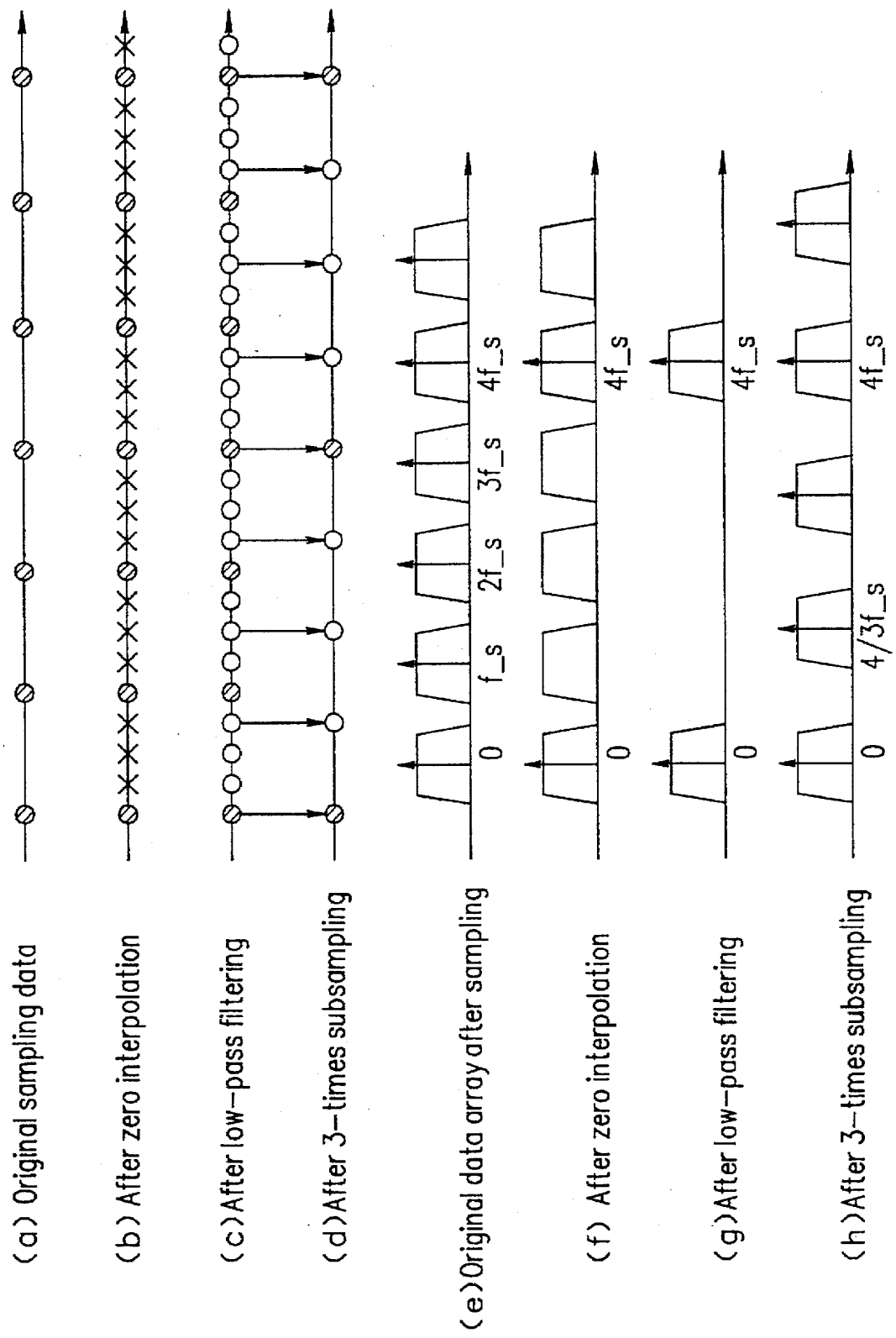
FIG. 19 is a view illustrating the positional relationship between pixels and spectra in the frequency band in order to describe the principle of the horizontal 3→4 conversion.
Figure 20:
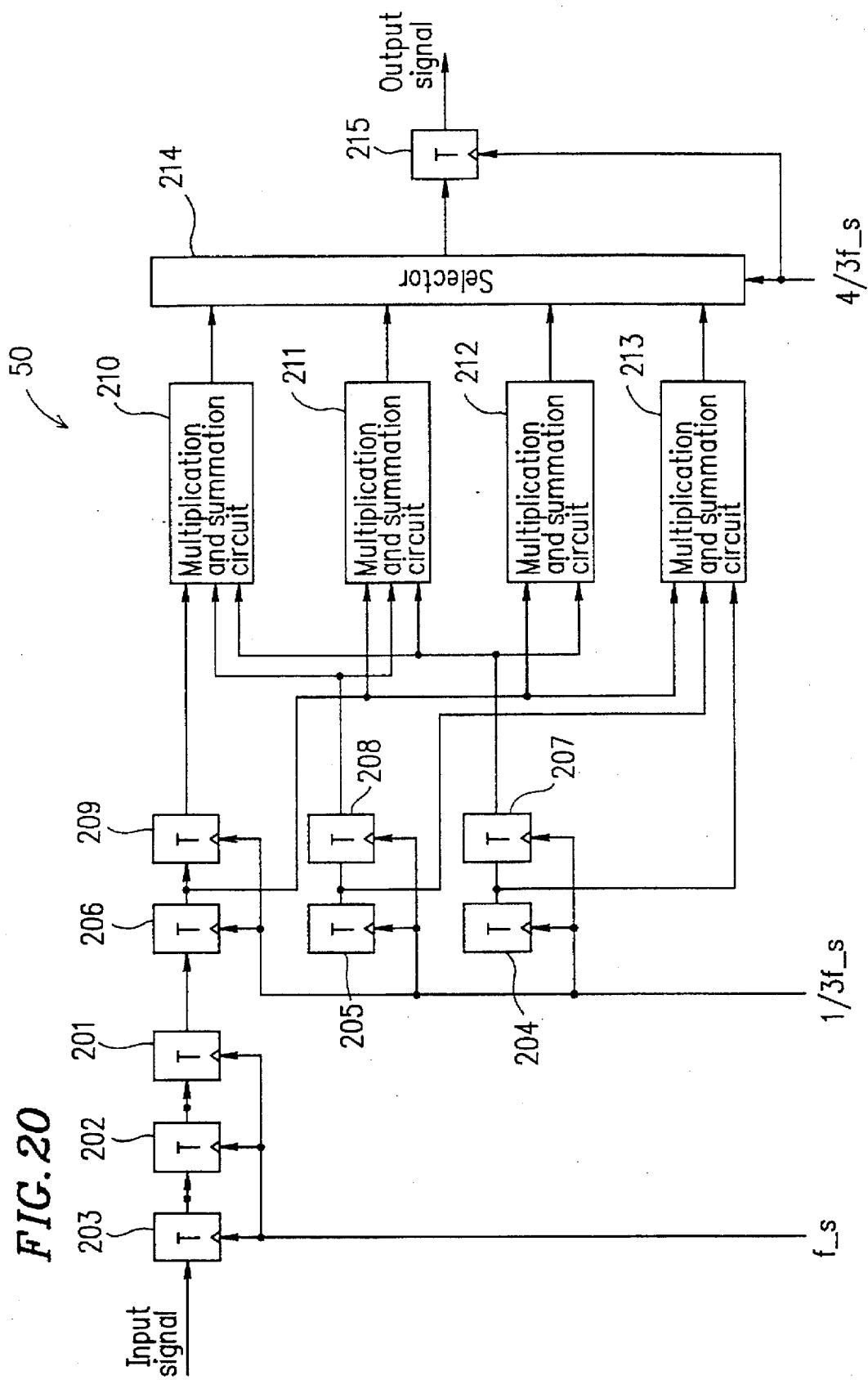
FIG. 20 is a block diagram of a conventional video signal format conversion apparatus.

FIG. 18 is a timing diagram illustrating the operation of the horizontal direction operation circuit 24. Data stream 180 indicates the timing of the data corresponding to each pixel represented by the input signal 15, and data stream 181 indicates the timing of the data corresponding to each pixel represented by the output signal 19.

Pixel data represented by the input signal 15 is indicated as x(n) (n: integer); and pixel data represented by the output signal 19 is indicated as y(n) (n: integer). The integer n is sequentially allocated to the pixels on the scanning line on the display screen. Symbol "x" represents the position of 0 data which is obtained by virtual zero interpolation.

In the following example, the low-pass filter used for the horizontal direction conversion has nine taps, and the weighting factors are symmetrical as expressed by expression (13).

$$k(4), k(3), k(2), k(1), k(0), k(1), k(2), k(3), k(4) \quad (13)$$

Further, the output 501 is x(1), the output 502 is x(1), the output 503 is x(0), and the output 504 is x(−1). The data y(0) in FIG. 18 is obtained by expression (14) as is apparent from the principle of sampling frequency conversion.

$$y(0) = k(3) \cdot x(-1) + k(0) \cdot x(0) + k(3) \cdot k(1) \quad (14)$$

The part of the horizontal direction operation circuit 24 corresponding to the multiplication and summation circuit 3 (FIG. 6) operates so as to multiply the output 502 by k(3), the output 503 by k(0), and the output 504 by k(3) and summate the resultant values. Thus, y(0) is obtained. For obtaining data y(1) and y(2), the horizontal direction operation circuit 24 operates as expressed by expressions (15) and (16).

$$y(1) = k(2) \cdot x(0) + k(1) \cdot x(1) + k(4) \cdot k(2) \quad (15)$$

$$y(2) = k(4) \cdot x(0) + k(1) \cdot x(1) + k(2) \cdot k(2) \quad (16)$$

Data y(3) . . . y(n) are obtained by repeating the manner for obtaining y(0) through y(2).

The output signal 19 from the horizontal direction operation circuit 24 is obtained as the result of the format conversion in the horizontal direction in addition to the format conversion in the vertical direction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video signal format conversion apparatus, comprising:

a memory for writing an input data by a first clock equal to a sampling rate of the input data and reading the input data by a second clock which is different from the first clock;

a shift register which is coupled to the memory, and is driven by the second clock, wherein a shift operation is performed in each cycle of the second clock, and no signals other than the second clock are needed for the shift operation;

a multiplication and summation circuit which is coupled to the shift register for cyclically multiplying each of a plurality of data output from the shift register by a factor utilizing pipeline processing synchronous with the second clock, thereby calculating a sum of values obtained by the multiplication by the second clock.

2. A video signal format conversion apparatus according to claim 1, wherein the multiplication and summation circuit includes:

a factor register for storing the plurality of factors;

a factor selector for selectively outputting the plurality of factors output from the factor register;

a plurality of multipliers for multiplying the plurality of data output from the shift register by the respective factors output from the factor selector; and an adder for outputting the sum of the values output from the plurality of multipliers.

3. A video signal format conversion apparatus according to claim 2, wherein the adder generates a sum of three data output from the multipliers.

4. A video signal format conversion apparatus according to claim 2, further comprising a data selector for selectively supplying the multipliers with the plurality of data output from the shift register.

5. A video signal format conversion apparatus, comprising:

a plurality of memories for writing an input data by a first clock equal to a sampling rate of the input data and reading the input data by a second clock which is different from the first clock;

a line memory array for storing the data corresponding to one line read from the plurality of memories;

a vertical direction operation circuit driven by the second clock for multiplying each of the plurality of signals output from the line memory array by a factor corresponding thereto among a plurality of factors in the vertical direction and summing values obtained by the multiplication; and a horizontal direction operation circuit driven by the second clock for multiplying each of a plurality of signals output from the vertical direction operation circuit by a factor corresponding thereto among a plurality of factors in the horizontal direction and summing values obtained by the multiplication.

6. A video signal format conversion apparatus according to claim 5, wherein the line memory array includes:

a plurality of selectors for selectively outputting a plurality of signals output from the plurality of memories; and a plurality of delay circuits for delaying the signals output from the respective selectors.

7. A video signal format conversion apparatus according to claim 6, wherein the vertical direction operation circuit includes:

a factor register for storing the plurality of factors;

a factor selector for selectively outputting the plurality of factors;

a plurality of multipliers for respectively multiplying the plurality of data output from the line memory array and the respective factors output from the factor selectors; and an adder for outputting the sum of the values output from the plurality of multipliers.

8. A video signal format conversion apparatus according to claim 7, wherein the adder generates a sum of three data output from the multipliers.

* * * * *